(12) United States Patent
Shimizu

(10) Patent No.: US 11,181,920 B2
(45) Date of Patent: Nov. 23, 2021

(54) TRAVEL ASSISTANCE METHOD AND TRAVEL ASSISTANCE APPARATUS

(71) Applicant: DENSO CORPORATION, Kariya (JP)

(72) Inventor: Shun Shimizu, Kariya (JP)

(73) Assignee: DENSO CORPORATION, Kariya (JP)

( * ) Notice: Subject to any disclaimer, the term of this patent is extended or adjusted under 35 U.S.C. 154(b) by 169 days.

(21) Appl. No.: 16/545,699

(22) Filed: Aug. 20, 2019

(65) Prior Publication Data

US 2020/0073396 A1 Mar. 5, 2020

(30) Foreign Application Priority Data

Aug. 28, 2018 (JP) .............................. JP2018-159610
Mar. 27, 2019 (JP) .............................. JP2019-061696

(51) Int. Cl.
*G05D 1/02* (2020.01)
*B60W 30/18* (2012.01)
*B60W 30/12* (2020.01)

(52) U.S. Cl.
CPC ........... *G05D 1/0219* (2013.01); *B60W 30/12* (2013.01); *B60W 30/18163* (2013.01); *G05D 1/0221* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,304,818 B1 * | 10/2001 | Kamiya | ................ | G01C 21/30 701/520 |
| 8,428,820 B2 * | 4/2013 | Ottenhues | .......... | B62D 15/0285 701/41 |
| 9,383,212 B2 * | 7/2016 | Dorum | ................... | G01C 21/30 |
| 2004/0109001 A1 * | 6/2004 | Grandine | .............. | G06T 11/203 345/442 |
| 2017/0213466 A1 * | 7/2017 | Azar | .................... | G05D 1/0088 |
| 2017/0236413 A1 * | 8/2017 | Takagi | .................. | B60W 40/09 701/117 |
| 2017/0294036 A1 * | 10/2017 | Dorum | .................. | G06T 11/203 |
| 2017/0361841 A1 * | 12/2017 | Kojo | ................. | B60W 30/0956 |
| 2018/0238696 A1 * | 8/2018 | Takeda | ................ | B60W 30/095 |
| 2018/0286242 A1 * | 10/2018 | Talamonti | ............. | B60W 30/14 |
| 2018/0326995 A1 * | 11/2018 | Hiramatsu | .......... | B60W 50/082 |

FOREIGN PATENT DOCUMENTS

| | | | |
|---|---|---|---|
| JP | 8-123547 A | | 5/1996 |
| JP | 2012002753 A | * | 1/2012 |
| JP | 2017-027354 A | | 2/2017 |

OTHER PUBLICATIONS de Boor, Carl; Hollig, Klaus; Sabin, Malcolm. "High Accuracy Geometric Hermite Interpolation." Computer Sciences Technical Report #692. May 1987. (Year: 1987).*

* cited by examiner

*Primary Examiner* — Jeff A Burke
*Assistant Examiner* — Madison B Emmett
(74) *Attorney, Agent, or Firm* — Maschoff Brennan

(57) ABSTRACT

A travel assistance method that is performed by a computer including at least one processor is provided. The travel assistance method assists travel of a subject vehicle and includes: setting a start point and an end point of a route where the subject vehicle travels along a curve; assuming a triangle including the start point and the end point; setting a control point on each of two sides of the triangle to assume a quadrangle; calculating a route line accommodated in the quadrangle; and assisting the subject vehicle in traveling along the curve.

12 Claims, 23 Drawing Sheets

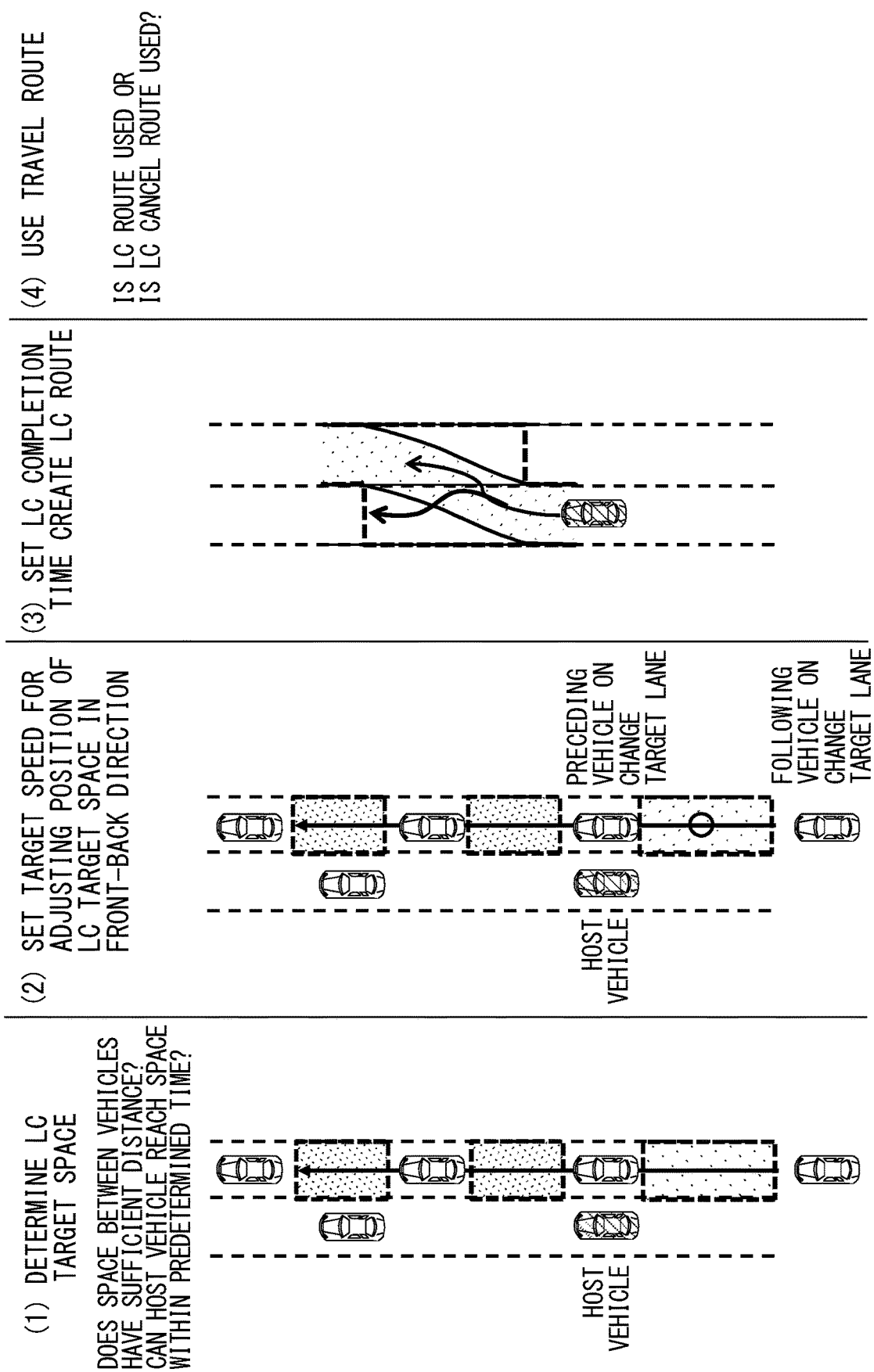

FIG. 19A
FIG. 19B
FIG. 19C
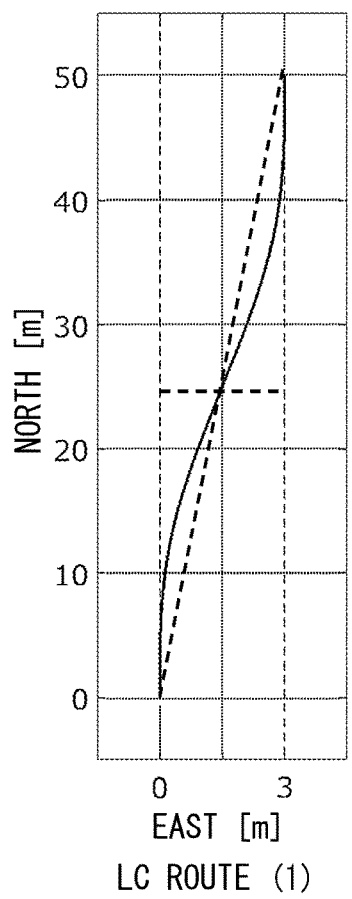
LC ROUTE (1)
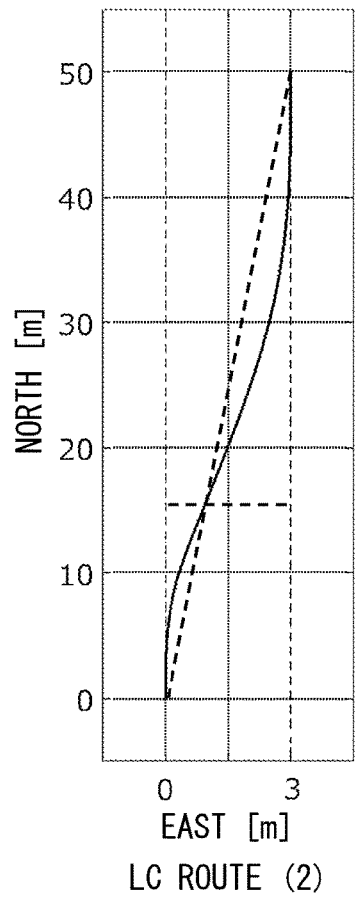
LC ROUTE (2)
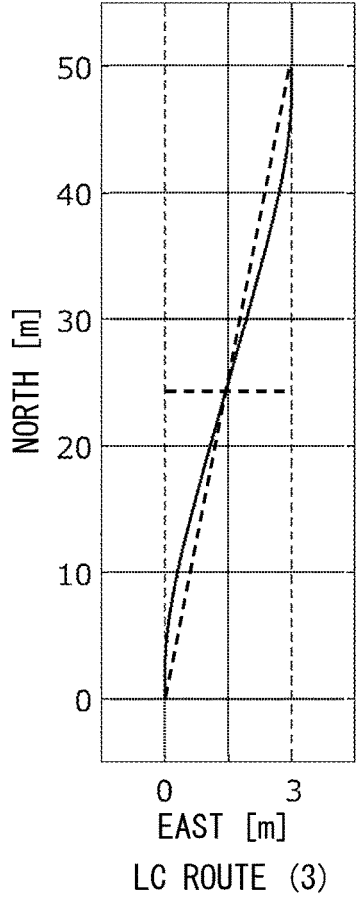
LC ROUTE (3)

LC ROUTE (1)

LC ROUTE (1)

LC ROUTE (2)

LC ROUTE (2)

LC ROUTE (3)

LC ROUTE (3)

TRAVEL ASSISTANCE METHOD AND TRAVEL ASSISTANCE APPARATUS

CROSS REFERENCE TO RELATED APPLICATIONS

The present application claims the benefit of priority from Japanese Patent Application No. 2018-159610 filed on Aug. 28, 2018 and Japanese Patent Application No. 2019-061696 filed on Mar. 27, 2019. The entire disclosures of all of the above applications are incorporated herein by reference.

TECHNICAL FIELD

The present disclosure relates to a travel assistance method and a travel assistance apparatus for assisting travel of a vehicle.

BACKGROUND

A track generation method used for unmanned driving of a mobile robot has been known.

SUMMARY

The present disclosure describes a travel assistance method assisting travel of a subject vehicle. The method may include: setting a start point and an end point of a route; assuming a triangle including the start point and the end point; setting a control point on each of two sides; calculating a route line accommodated in the quadrangle; and assisting the subject vehicle in traveling along the curve following the route line.

BRIEF DESCRIPTION OF DRAWINGS

Features and advantages of the present disclosure will become more apparent from the following detailed description with reference to the accompanying drawings. In the drawings:

FIG. 18 is a schematic view illustrating creation of an LC route;

FIG. 19A is a schematic view of LC routes;

FIG. 19B is a schematic view of LC routes;

FIG. 19C is a schematic view of LC routes;

DETAILED DESCRIPTION

A track generation method used for unmanned driving of a mobile robot has been known. In the track generation method, a spline curve passing main passing points within a road area is generated and whether the spline curve is out of the road area is evaluated. In the track generation method, if the spline curve is accommodated in the road area, the spline curve is used as a track. When a spline curve generated is accommodated in a road area, the spline curve generated is used as a track. Consequently, even if a spline curve that deviates left or right within the road area is generated, the spline curve may be used as the track. When this technology is employed to assist a vehicle in traveling along a curve, the vehicle may deviate largely left or right during traveling.

The present disclosure describes a travel assistance method and a travel assistance apparatus capable of reducing deviation of a subject vehicle when the subject vehicle travels along a curve.

According to one aspect of the present disclosure, a travel assistance method that is performed by a computer including at least one processor is provided. The travel assistance method assists travel of a subject vehicle and includes: setting a start point and an end point of a route where the subject vehicle travels along a curve; assuming a triangle including the start point and the end point as two vertexes; setting a control point on each of two sides of the triangle to assume a quadrangle including the two control points, the start point, and the end point as four vertexes; calculating a route line accommodated in the quadrangle; and assisting the subject vehicle in traveling along the curve following the route line.

According to another aspect of the present disclosure, a travel assistance apparatus includes: a point setting section that sets a start point and an end point of a route when a subject vehicle travels along a curve and assumes a triangle including the start point and the end point as two vertexes; a route line calculation section that sets a control point on each of two sides of the triangle, assumes a quadrangle including the two control points, the start point, and the end point as four vertexes, and calculates a route line accommodated in the quadrangle; and a curve assistance section that assists the subject vehicle in traveling along the curve following the route line.

According to these disclosures, it may possible to prevent generation of a route line out of a quadrangle. It may be possible to provide a travel assistance method and a travel assistance apparatus capable of reducing deviation of a subject vehicle when the subject vehicle travels along a curve.

Embodiments will be described with reference to the drawings. FIG. 1 to FIG. 24 disclose a travel assistance method and a travel assistance apparatus 100.

First Embodiment

Figure 1:
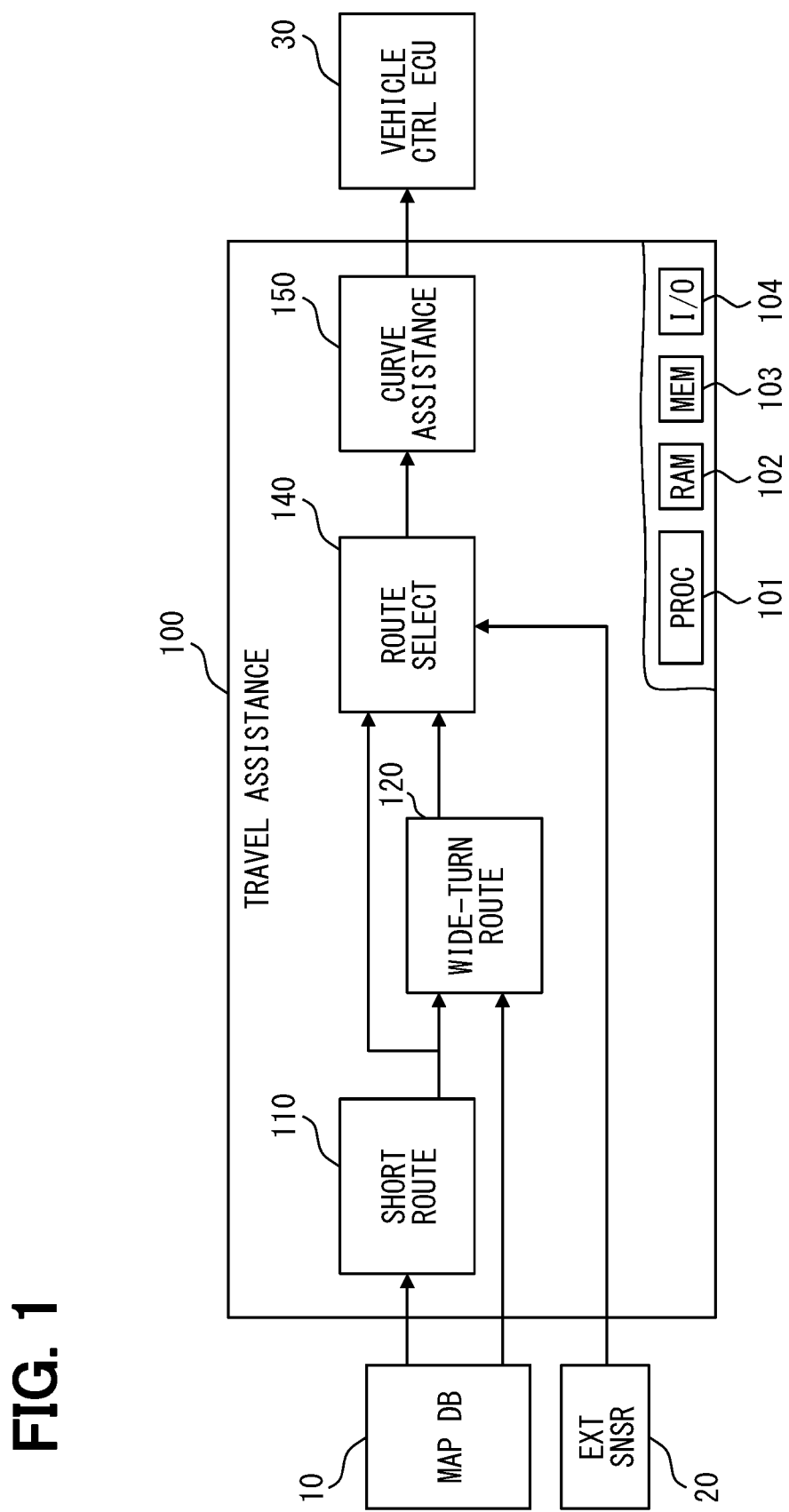
FIG. 1 is a block diagram of a travel assistance apparatus according to a first embodiment.

A travel assistance apparatus 100 is provided by an in-vehicle ECU of a subject vehicle, for example. The in-vehicle ECU is a computer mounted on a vehicle, and includes a microcomputer (also referred to as a microcontroller or a microprocessor) including at least one processor 101, a RAM 102, a memory device 103, an input/output interface 104, and buses connecting these components. More specifically, the travel assistance apparatus 100 is provided by an automated driving ECU that controls automated driving of the subject vehicle. As illustrated in FIG. 1, the travel assistance apparatus 100 is communicably connected to a map database (DB) 10, an external sensor 20, and a vehicle control ECU 30 through an in-vehicle network.

The map DB 10 includes a non-volatile memory, and stores high precision map data prepared for automated driving (hereinafter, "high precision map data"). The map DB 10 includes, as the high precision map data, three-dimensional map information configured by the shape of roads and groups of feature points of structures, information about the shape and position of roadway markings, stop lines, crosswalks, and central markings at intersections, and road attribute information. The road attribute information is information as to whether a road includes only a straight lane or also includes a right-turn-only lane in addition to the straight lane. The map DB 10 is incorporated in a locator that acquires the present position of the subject vehicle by a global navigation satellite system (GNSS) receiver, for example.

The map DB 10 may be a database that stores a large amount of map data used for route guide by a navigation device.

The external sensor 20 is an autonomous sensor that monitors the surrounding environment of the subject vehicle. The external sensor 20 detects stationary objects including fallen objects on roads, guardrails, curbstones, road displays such as roadway markings, and trees. The external sensor 20 also detects mobile objects including pedestrians, animals other than humans, and other vehicles. Examples of the external sensor 20 include a front camera, LIDAR (Light Detection and Ranging), and a milliwave radar.

The vehicle control ECU 30 is an ECU that controls the behavior of a subject vehicle. The vehicle control ECU 30 is electrically connected directly or indirectly to an in-vehicle actuator group. The in-vehicle actuator group includes motors for driving motor generators for drive and regeneration, brake actuators, and steering actuators. The vehicle control ECU 30 controls the in-vehicle actuator group based on route information output from the travel assistance apparatus 100 and performs automated travel of the subject vehicle along a created route.

The travel assistance apparatus 100 creates a route on which the subject vehicle travels based on information output from the map DB 10 and the external sensor 20 and controls an autonomous drive operation of the subject vehicle along the route. As an aspect, the travel assistance apparatus 100 creates a right turn route at an intersection. The travel assistance apparatus 100 includes, as functional blocks, a short route creation section 110, a wide-turn route creation section 120, a route selection section 140, and a curve assistance section 150. The processor 101, which is a processing unit of the automated driving ECU, accesses the RAM 102 to use a temporary storage function of the RAM 102 and executes a travel assistance program stored in the memory device 103, whereby a travel assistance method is achieved. More specifically, the travel assistance apparatus 100 achieves creation of a short route (small turn route), setting of a right turn waiting position in the short route, creation of a wide turn route, and setting of a right turn waiting position in the wide turn route.

The short route creation section 110 first acquires information about a start point and an end point of a route line for the purpose of creating a short route. The short route creation section 110 determines an intersection entrance on an approach lane of a subject vehicle as the start point and an intersection exit on an exit lane as the end point. The short route creation section 110 acquires position information and angle information about the intersection entrance (start point). The angle information is information about the angle at which the approach lane is connected to the intersection at the start point. The short route creation section 110 also acquires position information and angle information about the intersection exit (end point). Information about distances from the start point and the end point to left and right white lines may be acquired in addition to these pieces of information. The short route creation section 110 also acquires position information and angle information (information about the angle at which the exit lane is connected to the intersection at the end point) about a start point and an end point of an opposite lane, information about distances to left and right white lines, and attribute information for the purpose of calculating a right turn waiting position to be described later. The short route creation section 110 acquires these pieces of information from the map DB 10 as true values.

The short route creation section 110 may acquire at least a part of the information about the start point and the end point from the external sensor 20 such as a front camera. For example, the short route creation section 110 may acquire the information about the start point based on information about the position and shape of a stop line obtained by image recognition. Alternatively, the short route creation section 110 may acquire the position information of the start point by detecting a timing when a preceding vehicle turns a steering wheel using the external sensor 20. Further, the short route creation section 110 may acquire the information about the end point based on information of a stop line on the opposite lane on the exit lane. The short route creation section 110 may acquire the information about the start point and the end point as mixed information of the information from the map DB 10 and the information from the external sensor 20 such as a front camera. The short route creation section 110 determines the position of the start point or the end point in a lane width direction as the center of the lane, for example.

The short route creation section 110 acquires information about the center position and size of a central marking at an intersection and information about the center position and size of a no-travel area such as a curbstone. The no-travel area may be acquired as area information represented with a polygon, a center, an inscribed circle, or a circumcircle. The short route creation section 110 also acquires these pieces of information from the map DB 10 and the external sensor 20.

The short route creation section 110 functions as a point setting section to set a start point and an end point of a route when the subject vehicle turns right, and assumes a triangle including the start point and the end point as two vertexes. Specifically, the short route creation section 110 sets an intersection point X in an area of an intersection where an approach lane crosses an exit lane based on the position information and angle information of the start point and the end point acquired from the map DB 10. More specifically, as illustrated in (A) in FIG. 2, the short route creation section 110 acquires the point at which a half line extending from a start point $p_s$ in a direction of entering an intersection, that is, extending forward in a traveling direction of the approach lane crosses a half line extending from an end point $p_f$ in the opposite direction to a direction of exiting the intersection, that is, extending backward in a traveling direction of the exit lane as the intersection point X. The short route creation section 110 acquires the position information of three points $p_s$, $p_f$, and X and assumes a triangle including the start point $p_s$, the end point $p_f$, and the intersection point X as the vertexes.

The short route creation section 110 functions as a route line calculation section to additionally set a control point on each of two sides of the triangle, assume a quadrangle including added control points (hereinafter, "additional points"), the start point, and the end point as four vertexes, and calculate a route line accommodated in the quadrangle. Specifically, the short route creation section 110 defines two points satisfying the following expressions (1) and (2) as additional points $p_1$ and $p_2$ based on the position information about the vertexes of the triangle.

$$p_1 = \alpha p_s + (1-\alpha) X \quad \text{Expression (1)}$$

$$p_2 = \beta p_f + (1-\beta) X \quad \text{Expression (2)}$$

In the above two formulae, the range of $\alpha$ is $0<\alpha<1$. The range of $\beta$ is $0<\beta<1$. As illustrated in (B) in FIG. 2, the short route creation section 110 sets the additional points $p_1$ and $p_2$ on the two sides of the assumed triangle to assume a quadrangle including the additional points $p_1$ and $p_2$, the start point $p_s$, and the end point $p_f$ as four vertexes. The short route creation section 110 sets the initial values of $\alpha$ and $\beta$ to 0.5, for example. Incidentally, the quadrangle may be referred to as a tetragon, a plane figure having four angles and four sides.

Figure 2:
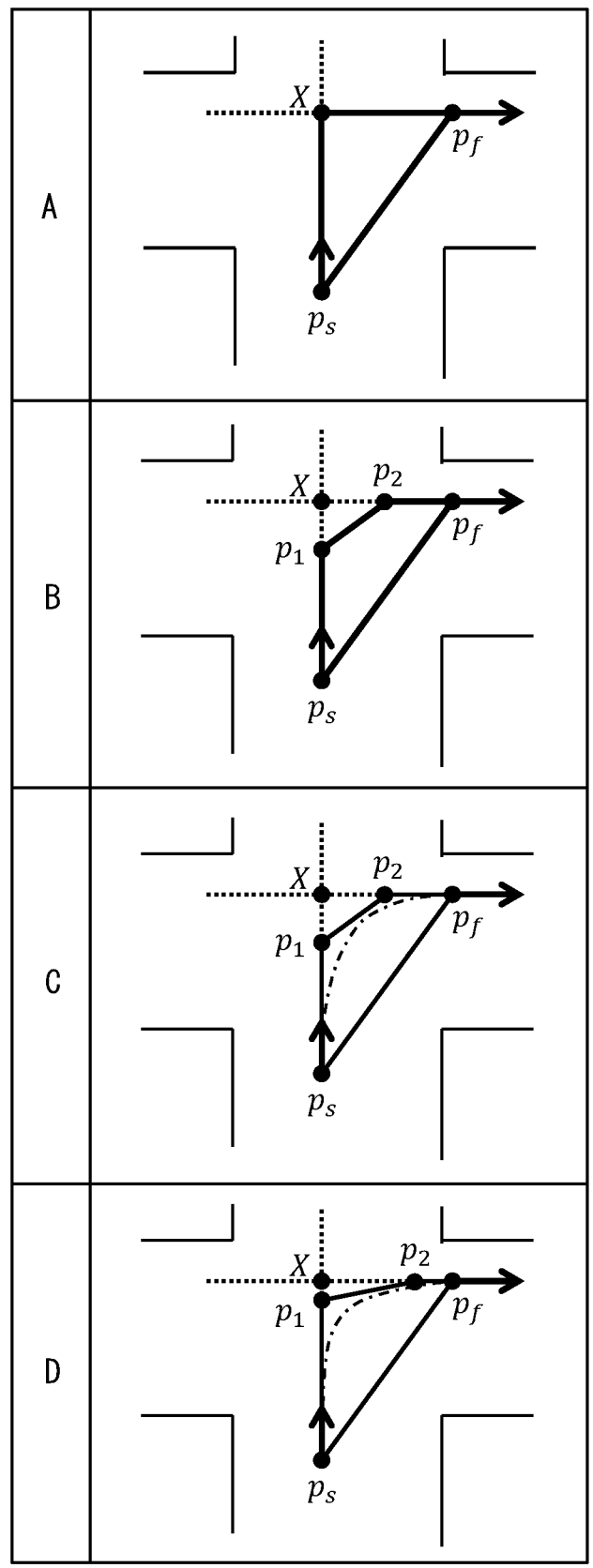
FIG. 2 is a schematic view illustrating creation of a right turn route at an intersection.
Figure 3:
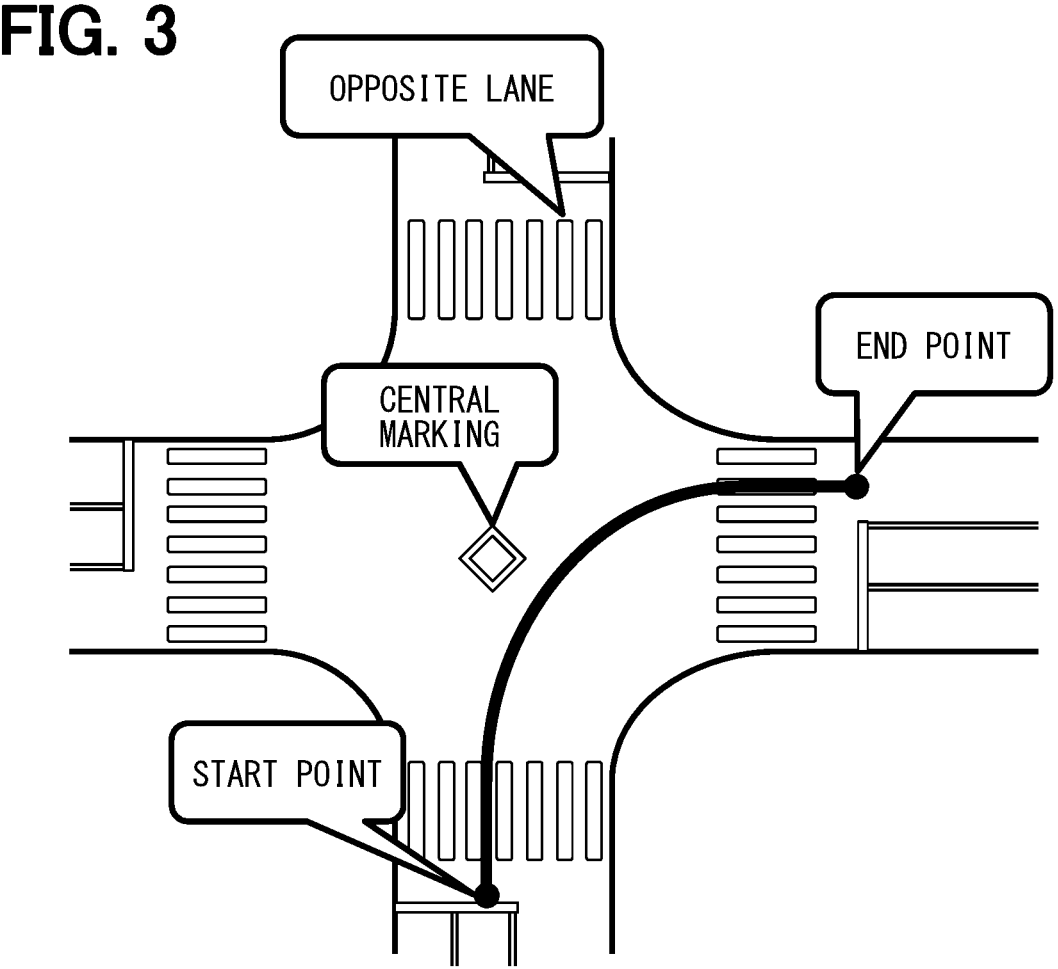
FIG. 3 is a schematic view illustrating the creation of a right turn route at an intersection.
Figure 4A:
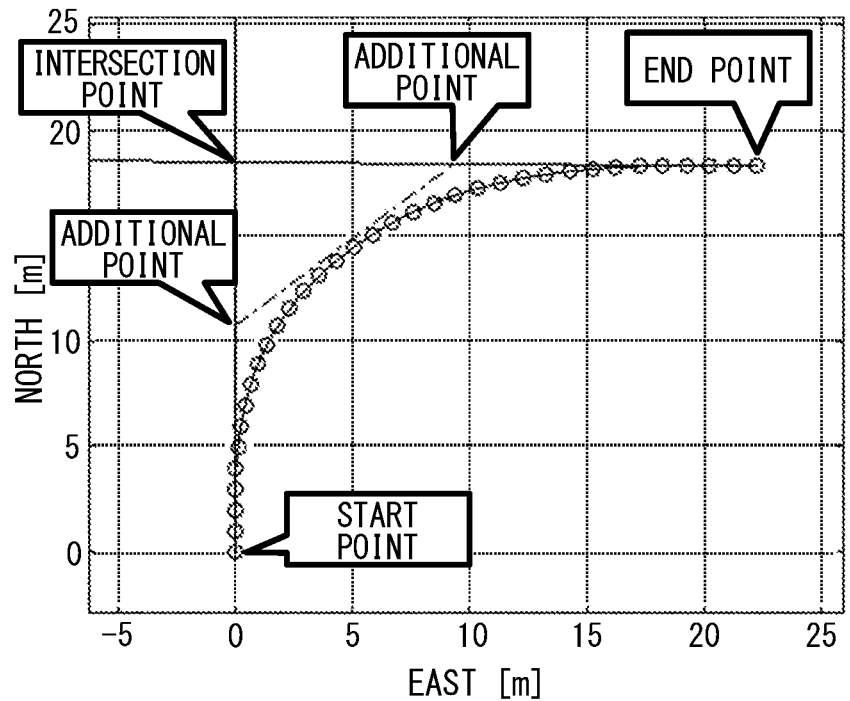
FIG. 4A is a schematic view of control points on the right turn route at the intersection.
Figure 4B:
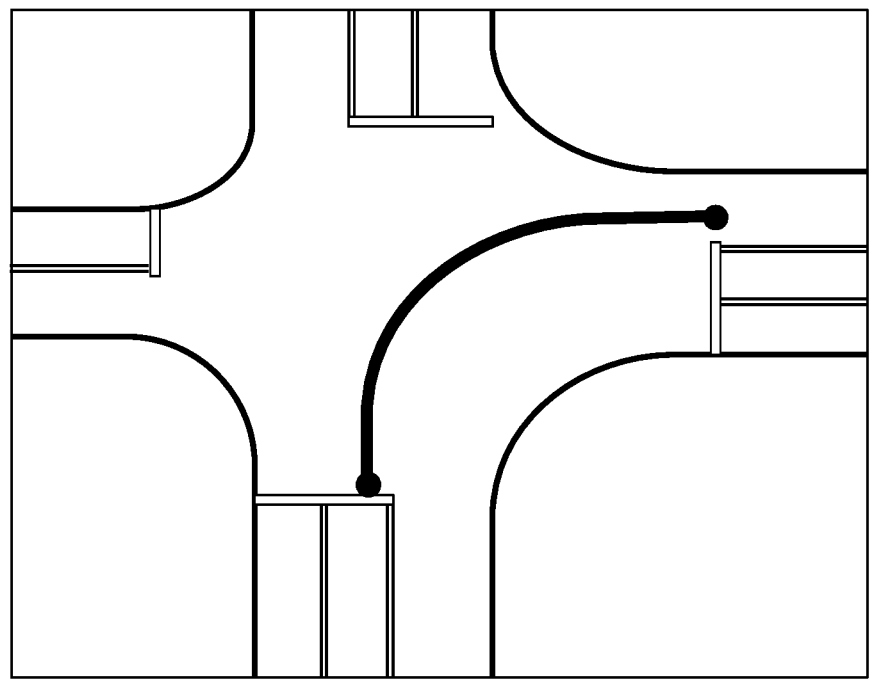
FIG. 4B is a schematic view of control points on the right turn route at the intersection.
Figure 5A:
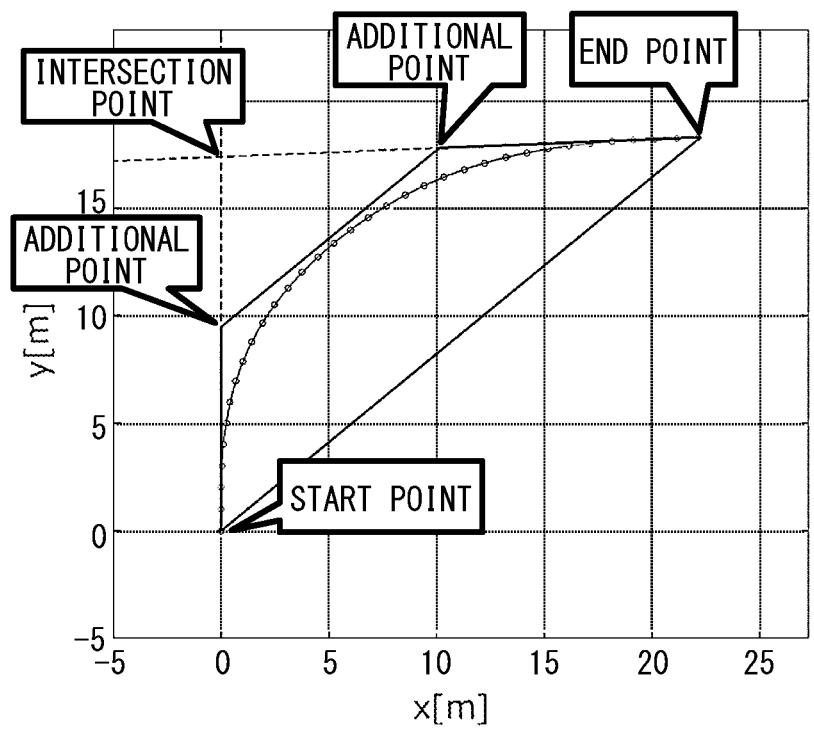
FIG. 5A is a schematic view of a quadrangle assumed in the right turn route at the intersection.
Figure 5B:
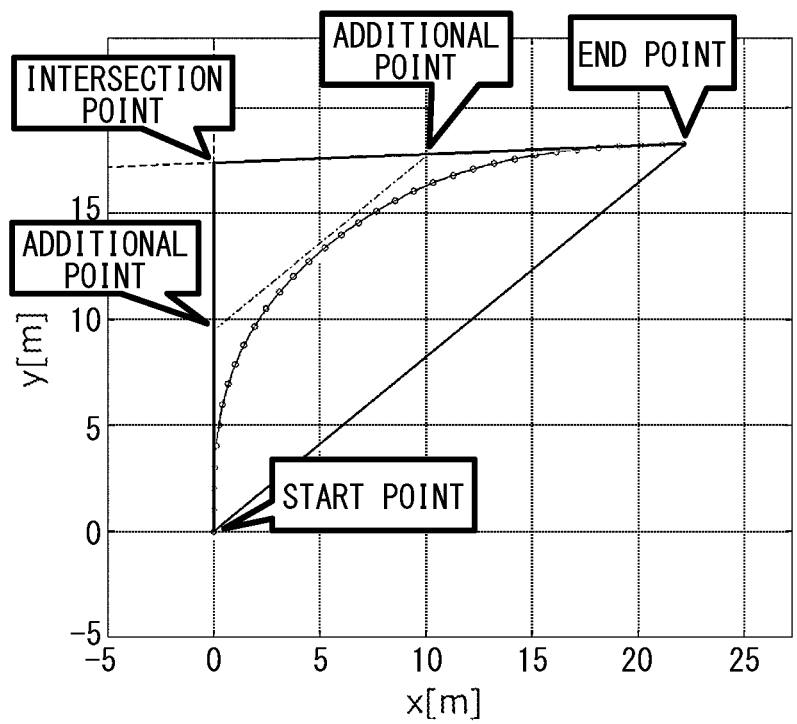
FIG. 5B is a schematic view of a triangle assumed in the right turn route at the intersection.
Figure 6A:
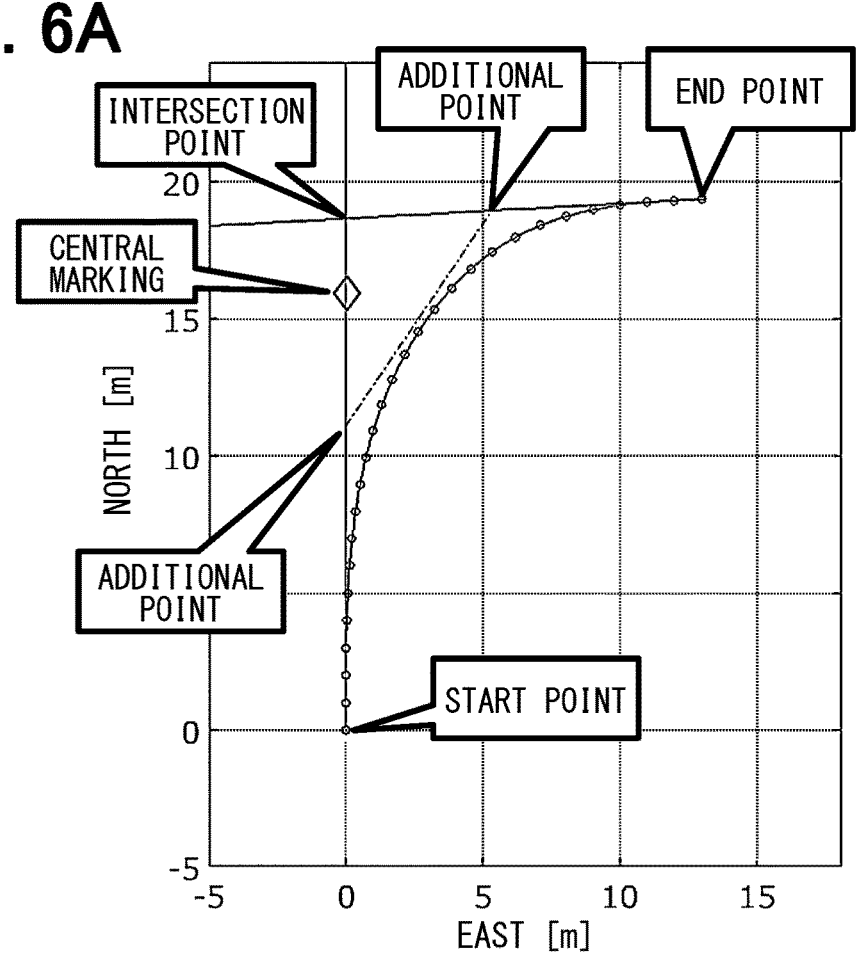
FIG. 6A is a schematic view of control points on a right turn route at an intersection with a central marking.
Figure 6B:
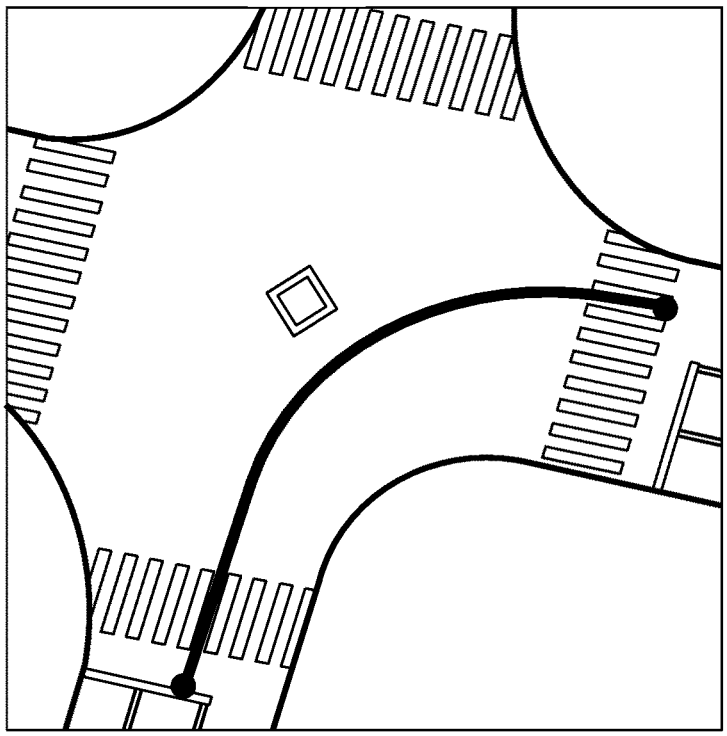
FIG. 6B is a schematic view of control points on a right turn route at an intersection with a central marking.
Figure 7A:
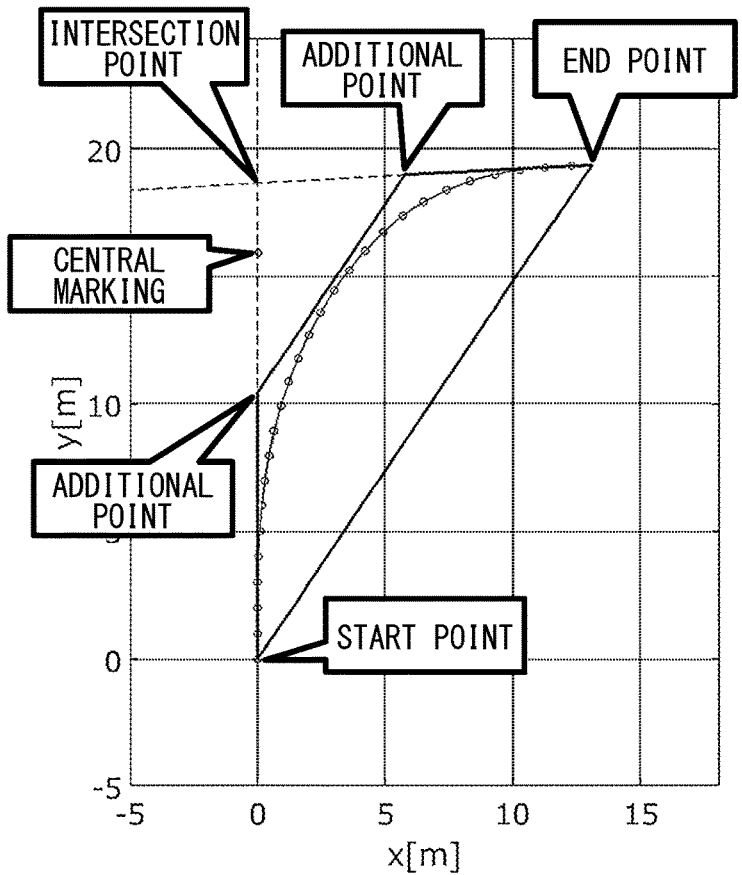
FIG. 7A is a schematic view of a quadrangle assumed in the right turn route at the intersection with the central marking.
Figure 7B:
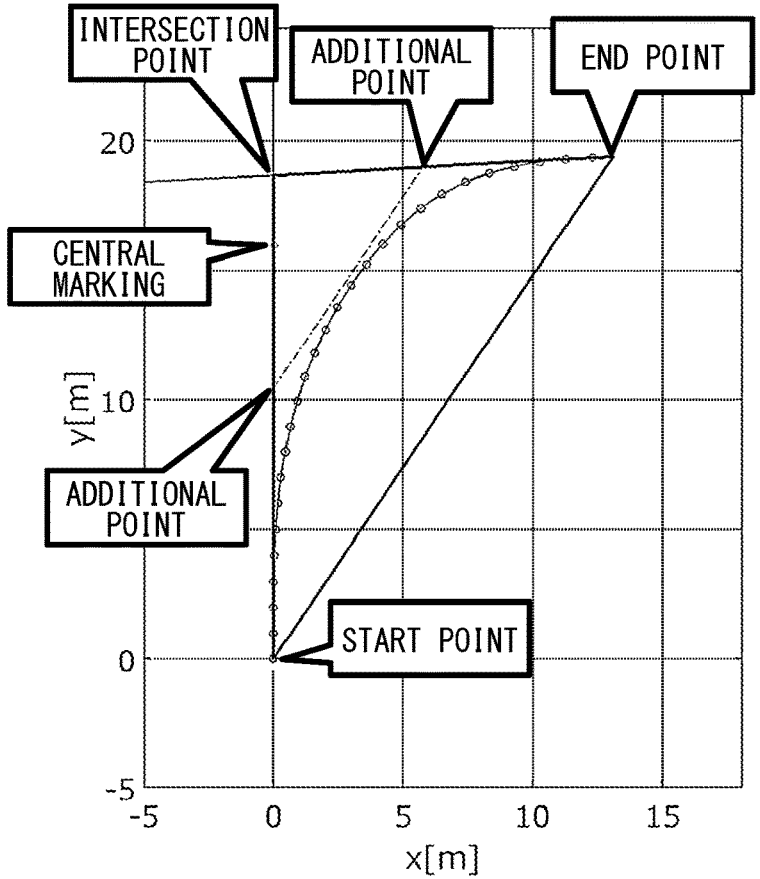
FIG. 7B is a schematic view of a triangle assumed in the right turn route at the intersection with the central marking.

The short route creation section 110 calculates an interpolation curve by using the four points $[p_s, p_1, p_2, p_f]$ as control points, as illustrated in (C) in FIG. 2. The short route creation section 110 thus calculates a route line accommodated in the assumed quadrangle. In this case, the short route creation section 110 performs interpolation by using a three or more dimensional parameter curve with curvature continuity as the interpolation curve so that the behavior of the subject vehicle or the steering wheel does not become unstable. A Bezier curve and a B-spline curve are used as the parameter curve. For example, when the interpolation is performed using a three-dimensional B-spline curve, the short route creation section 110 processes the start point and the end point as three-point overlapping control points. The short route creation section 110 thus calculates a B-spline curve that reliably passes the start point and the end point as the interpolation curve.

The short route creation section 110 functions as a curve evaluation section to evaluate the B-spline curve based on a curvature and a curvature change rate. In the evaluation, the short route creation section 110 sets a condition that the maximum curvature of a B-spline curve obtained and the number of plus and minus changes in curvature are less than the respective thresholds. The short route creation section 110 determines a B-spline curve satisfying the condition as the route line. The short route creation section 110 outputs the determined route line to the route selection section 140 as a short route. The short route creation section 110 also outputs the information about the start point and end point of the short route to the wide-turn route creation section 120.

When the B-spline curve does not satisfy the condition, as illustrated in (D) in FIG. 2, the short route creation section 110 changes the values of $\alpha$ and $\beta$ to change the positions of the additional points $p_1$ and $p_2$, and calculates the B-spline curve again. By repeating the above processes, the short route creation section 110 automatically searches for additional points on the sides of an assumed triangle.

The short route creation section 110 outputs the route line satisfying the condition as a target route (short route). In this way, the short route creation section 110 analytically derives a right turn route based on the position information and angle information of the start point and the end point.

When there is a central marking at an intersection as illustrated in FIG. 6A to FIG. 7B, the short route creation section 110 creates a route on which the subject vehicle can approach the central marking but avoid the central marking as a no-travel area. The central marking is a substantially diamond shaped marking near the center of an intersection and is an example of a marking that indicates a place where a traveling vehicle needs to be guided. Specifically, the short route creation section 110 determines a distance value from the central marking based on the size of the central marking, the width of the subject vehicle, and a predetermined margin. The short route creation section 110 determines a condition of setting positions of additional points so that the distance between a line segment connecting the two additional points and the central marking has a predetermined value. Based on the additional points determined as described above, the short route creation section 110 creates a route as described above (see FIG. 5A to FIG. 6B). The travel assistance apparatus 100 may use the information about the central marking for evaluation of an interpolation curve obtained.

In addition, the short route creation section 110 may use information about the no-travel area for setting of the additional points and evaluation of the interpolation curve.

The short route creation section 110 may acquire information about a point in an intersection area where the subject vehicle reliably passes and use the point as the point which the interpolation curve passes like the start point and the end point when calculating the interpolation curve.

Figure 8:
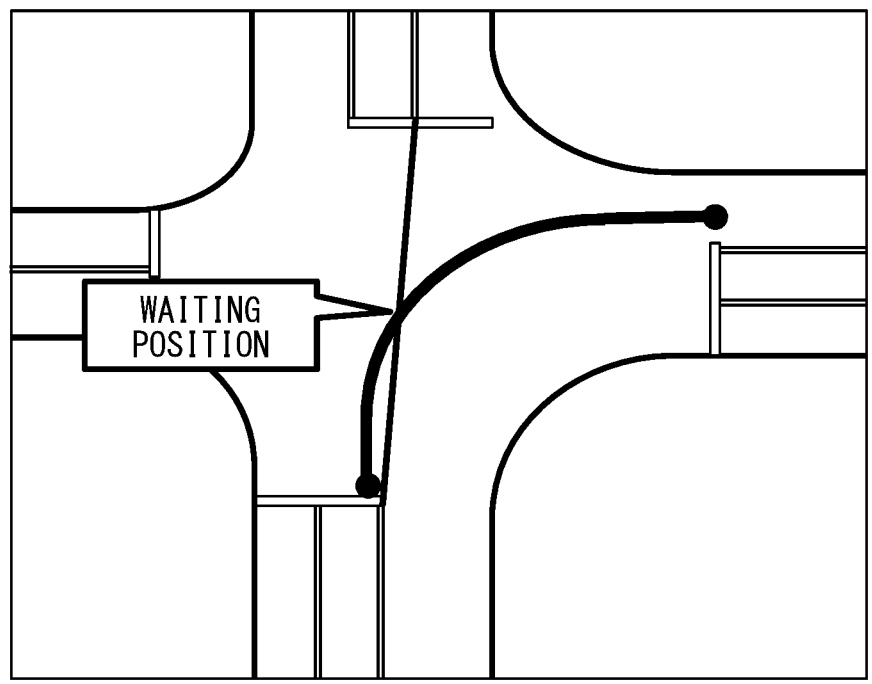
FIG. 8 is a schematic view illustrating setting of a right turn waiting position.
Figure 9A:
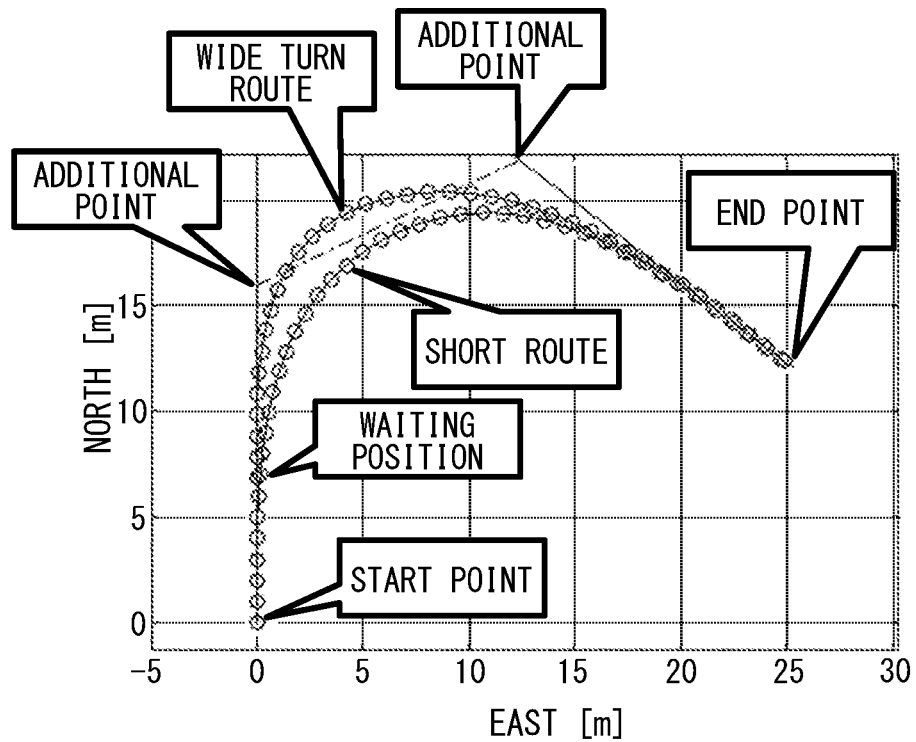
FIG. 9A is a schematic view illustrating creation of a wide turn route.
Figure 9B:
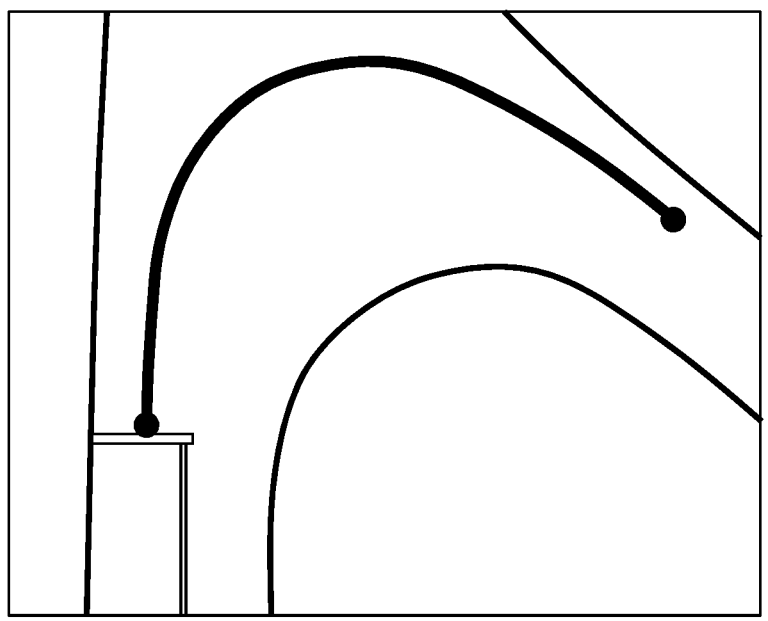
FIG. 9B is a schematic view illustrating creation of a wide turn route.
Figure 10A:
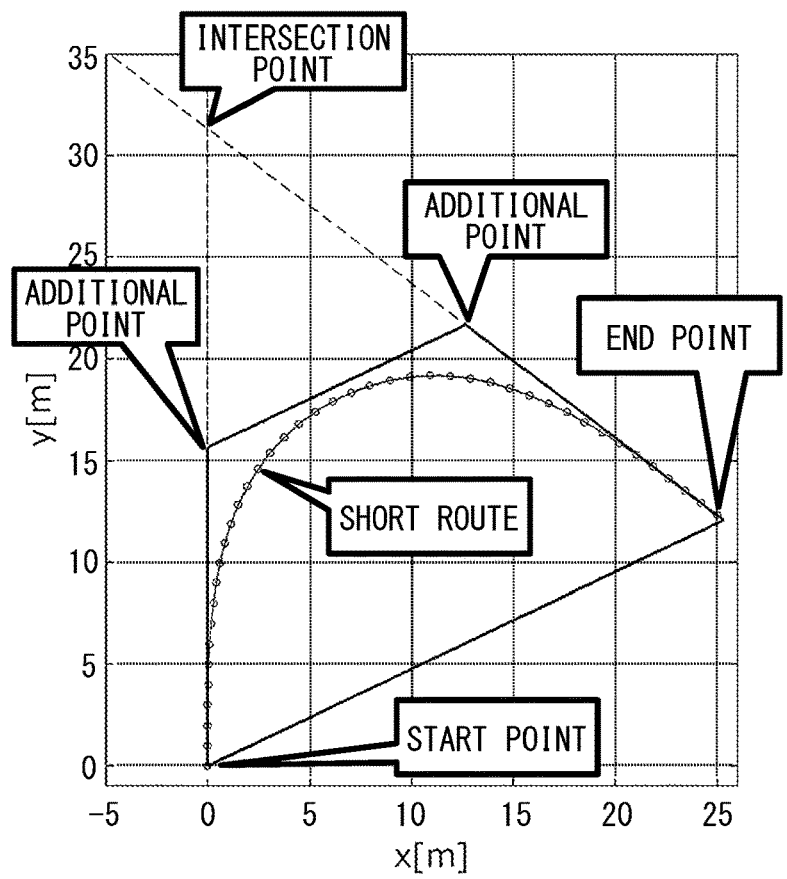
FIG. 10A is a schematic view of a quadrangle assumed in creating a short route at the intersection of FIG. 9A and FIG. 9B.
Figure 10B:
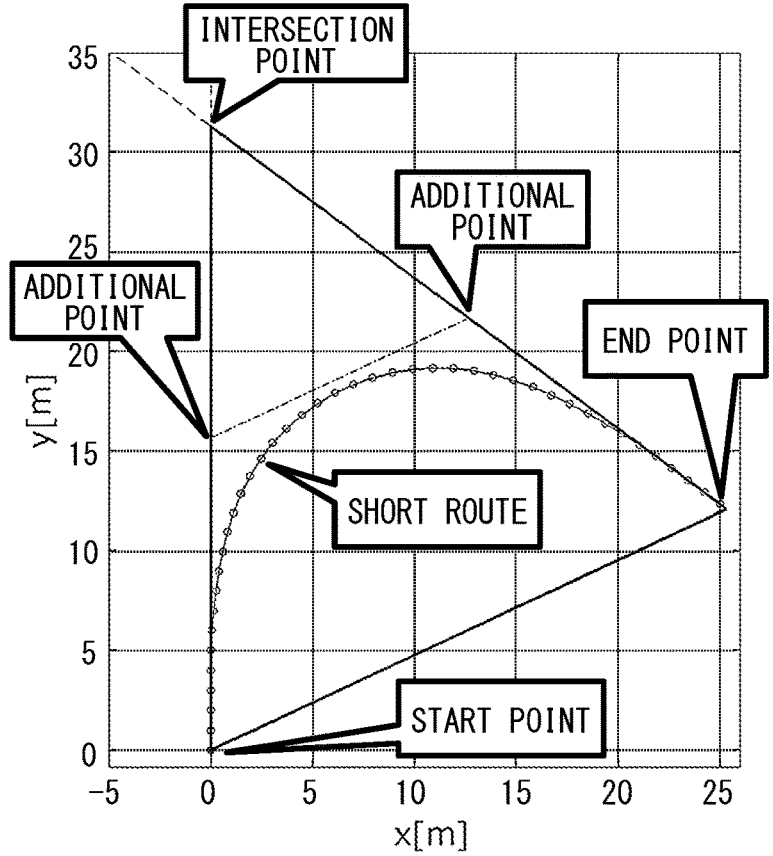
FIG. 10B is a schematic view of a triangle assumed in creating a short route at the intersection of FIG. 9A and FIG. 9B.
Figure 11A:
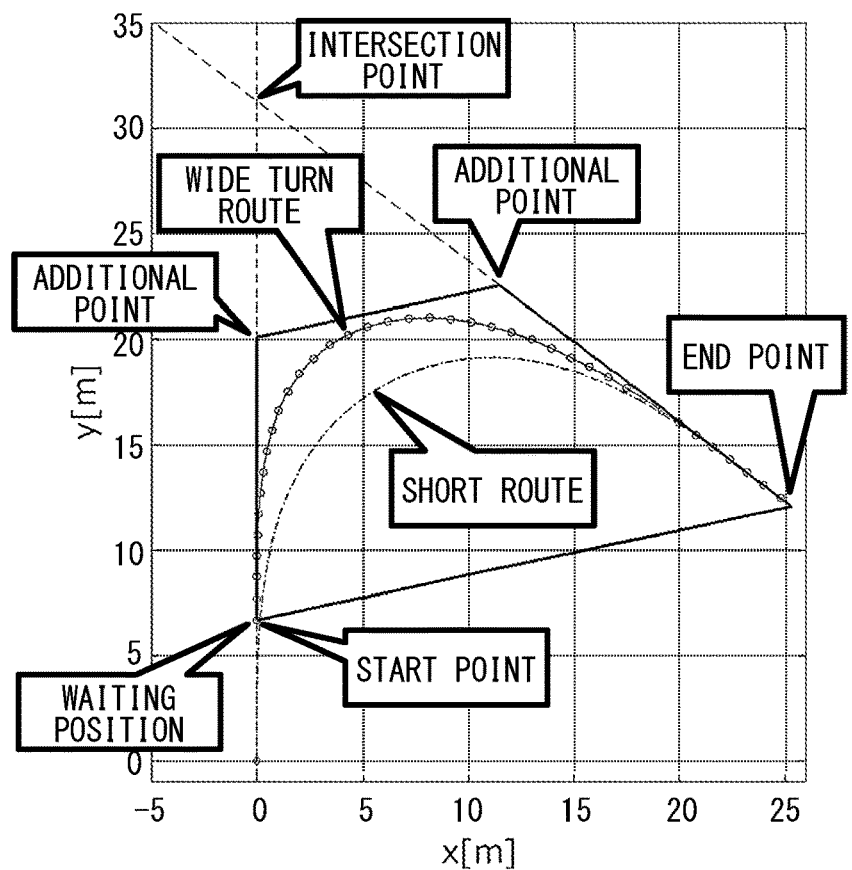
FIG. 11A is a schematic view of a quadrangle assumed in creating a wide turn route at the intersection of FIG. 9A and FIG. 9B.
Figure 11B:
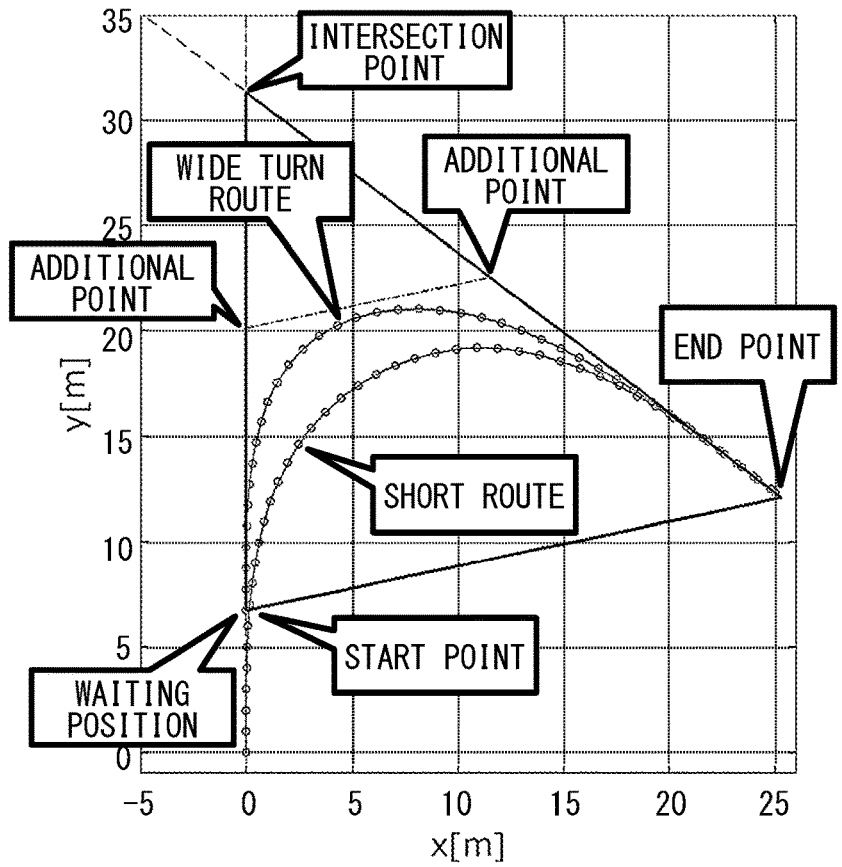
FIG. 11B is a schematic view of a triangle assumed in creating a wide turn route at the intersection of FIG. 9A and FIG. 9B.

The short route creation section 110 sets right turn waiting position information on the created short route. The short route creation section 110 sets the right turn waiting position at a position nearer to the start point than a portion where the route line crosses the opposite lane. Specifically, as illustrated in FIG. 8, the short route creation section 110 calculates first a line segment connecting positions of right white lines corresponding to a start point and an end point of the opposite lane.

The short route creation section 110 acquires an intersection point X~ of the created short route and the above-described line segment. It is assumed that the route length from the start point to the right turn waiting position is denoted by the term s and the route length to the intersection point X~ is denoted by the term s~. The short route creation section 110 sets a point that satisfies 0<s<s~, where the subject vehicle does not cross the line segment even if the subject vehicle is present on the route (in other words, the subject vehicle does not project forward from the line segment), and that achieves the longest route length as the right turn waiting position based on the size of the subject vehicle stored in the memory device 103 in advance.

The short route creation section 110 sets a position where the subject vehicle does not enter the travel area of an oncoming vehicle and the vehicle foreground is easily recognized by a sensor and a driver as the right turn waiting position.

The short route creation section 110 may connect the positions of right white lines corresponding to the start point and end point of the opposite lane not by a line segment but by an interpolation curve. For example, similarly to an LC route to be described later, the start point and the end point of the opposite lane are connected via set passing points to each other with an interpolation curve and the interpolation curve is adjusted with respect to the positions of right white lines. As a result, the interpolation curve connecting the positions of right white lines is generated. By using the interpolation curve instead of the line segment, the short route creation section 110 can set the right turn waiting position to be more adapted for the actual travel area of the oncoming vehicle.

As illustrated in FIG. 9A to FIG. 11B, the wide-turn route creation section 120 creates a wide turn route as a route on which a subject vehicle turns right while externally projecting from a short route. The wide-turn route creation section 120 first calculates a distance l in which the subject vehicle travels straight from a start point based on the short route, information of a right white line at the start point $p_s$ of the short route, information of a white line on the opposite lane, and the size of the subject vehicle. The wide-turn route creation section 120 calculates a point $\tilde{p}_s$ straightforward away from the start point by the distance l by the following expression (3).

$$\tilde{p}_s = p_s + l \begin{pmatrix} \cos(\theta_s) \\ \sin(\theta_s) \end{pmatrix} \quad \text{Expression (3)}$$

$\theta_s$ is a tilt angle of a straight route to a half line drawn from the start point in a direction of an approach lane. The wide-turn route creation section 120 sets the calculated point $\tilde{p}_s$ as a right turn waiting position on the wide turn route. The wide-turn route creation section 120 creates a route to an end point by using the right turn waiting position as a new start point in the same manner as that of the short route creation section 110. Consequently, as illustrated in FIG. 9A to FIG. 11B, the wide-turn route creation section 120 creates the wide turn route as a combining route of the straight route from the start point $p_s$ of the short route to the point $\tilde{p}_s$ and an interpolation curve route from the point $\tilde{p}_s$ to the end point $p_f$ connected to the straight route.

In the wide turn route, the position straightforward away from the start point of the short route by the distance l is set as the right turn waiting position. The subject vehicle traveling on the wide turn route thus waits to turn right while facing the straight direction. It may be possible to prevent the subject vehicle from entering the travel area of an oncoming vehicle during waiting to turn right.

The wide-turn route creation section 120 may calculate the wide turn route by adding control points. For example, by setting a new control point between the start point $p_s$ and the additional point $p_1$ and calculating an interpolation curve passing the control point, the wide turn route can be created.

The wide-turn route creation section 120 does not create the wide turn route when there is no opposite lane. The wide-turn route creation section 120 does not create the wide turn route when there is a right-turn-only lane on the opposite lane. The wide-turn route creation section 120 can avoid cases where an oncoming vehicle travelling straight is not recognized by a sensor or a driver because of an oncoming right-turn vehicle.

The route selection section 140 selects a right turn route on which a subject vehicle actually travels from a short route (small turn route) and a wide turn route in both of which a right turn waiting position and angle information are stored.

The route selection section 140 selects a travel route based on one of a determination by a driver and a determination by a state machine after detecting the presence of an oncoming vehicle before a subject vehicle enters an intersection. When the driver selects the short route, the route selection section 140 causes the subject vehicle to travel on the short route without waiting to turn right. When the driver does not select a route or when a route selection function is switched off and at the same time, there is an oncoming vehicle, the route selection section 140 selects the wide turn route and waits at a right turn waiting position until receiving permission from the driver. When there is no oncoming vehicle, the route selection section 140 selects the short route and waits at the right turn waiting position until receiving permission from the driver. The route selection section 140 waits until receiving permission to travel from the driver. Consequently, even if the subject vehicle cannot recognize the oncoming vehicle due to a sensing error, the driver can travel based on a visual determination by the driver himself.

The curve assistance section 150 outputs information of a selected right turn route to the vehicle control ECU 30 to assist autonomous travel of a subject vehicle. When an oncoming vehicle is detected after the subject vehicle enters the right turn route, the curve assistance section 150 outputs a signal to stop the subject vehicle at a right turn waiting position on the selected right turn route to the vehicle control ECU 30. Incidentally, travel of a curve may mean any travel situation in which a travelling direction of a vehicle changes, in addition to a right turn, a left turn, a lane change.

A series of processing performed by the travel assistance apparatus 100 for the purpose of achieving curve assistance at the time of turning right at an intersection, which has been described above, will be described with reference to flowcharts of FIG. 12 to FIG. 16.

Figure 12:
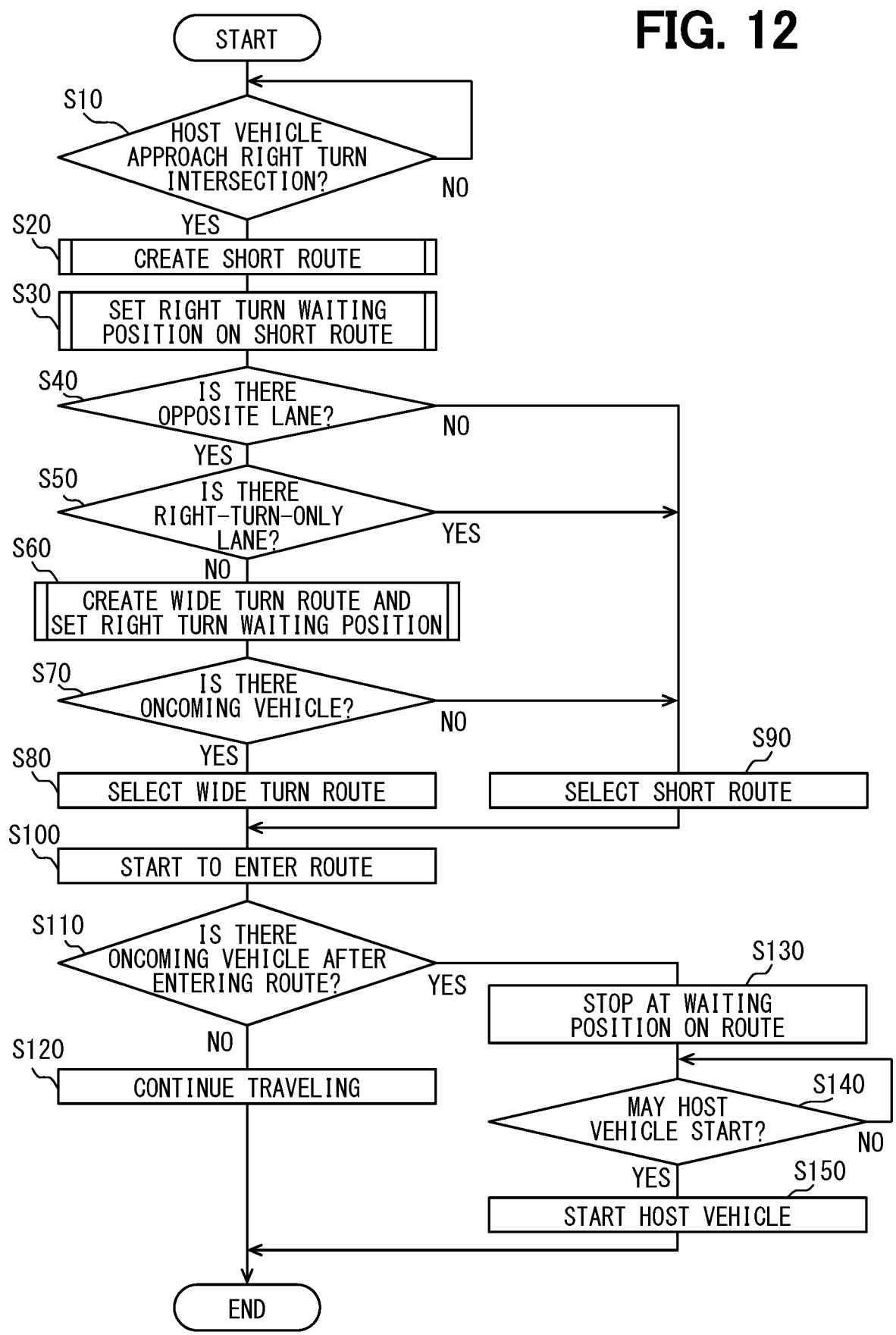
FIG. 12 is a flowchart of an example of processing performed by the travel assistance apparatus.

FIG. 12 is a flowchart illustrating the outline of a series of travel assistance processing of creating a route and causing a subject vehicle to travel along the created route at the time of turning right at an intersection. The travel assistance apparatus 100 repeatedly performs the processing illustrated in FIG. 12 during automated travel of the subject vehicle.

At S10, the travel assistance apparatus 100 determines whether the subject vehicle approaches a right turn intersection where the subject vehicle needs to turn right. The determination process at S10 is performed based on the current position of the subject vehicle and a proposed travel route to a destination. The process at S10 is repeatedly performed until the subject vehicle approaches the right turn intersection. When the subject vehicle is determined to approach the right turn intersection, the process proceeds to S20. At S20, a short route is created.

Figure 13:
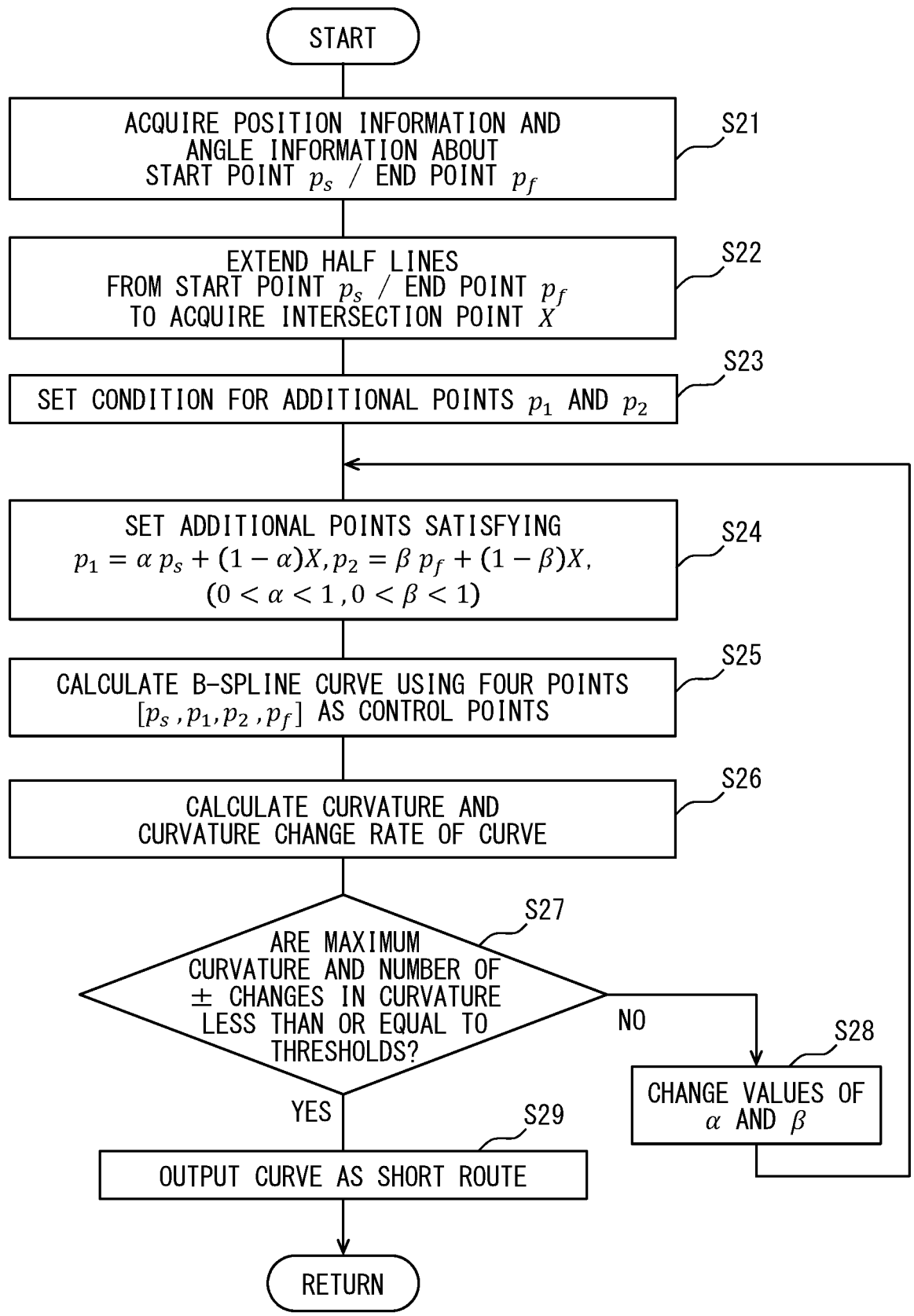
FIG. 13 is a flowchart illustrating details of S20 of FIG. 12.

A short route creation process is specifically described with reference to FIG. 13. At S21, position information and angle information about a start point and an end point are acquired and then the process proceeds to S22. At S22, the intersection point X is acquired based on the angle information, and then the process proceeds to S23. At S23, a condition for the positions of the additional points $p_1$ and $p_2$ is set based on information of a no-entry area (also referred to as an entry prohibited area).

Figure 14:
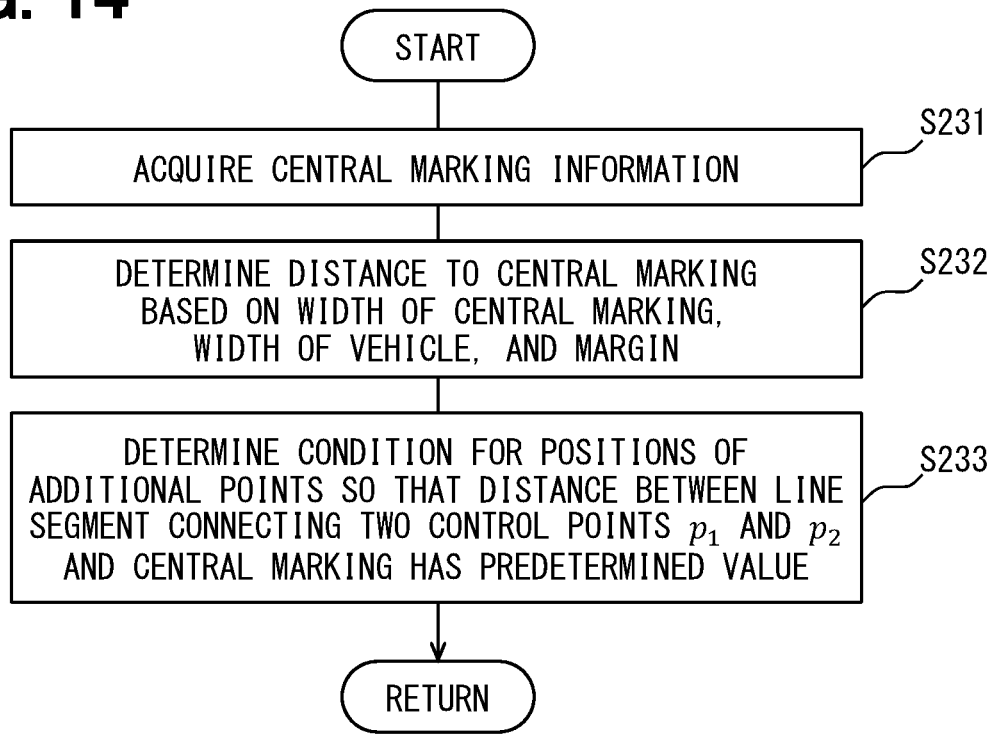
FIG. 14 is a flowchart illustrating details of S23 of FIG. 13.

Setting of the condition for the positions of the additional points $p_1$ and $p_2$ is specifically described with reference to FIG. 14. At S231, central marking information is acquired first as information about the no-entry area and then the process proceeds to S232. At S232, a distance to the central marking (for example, a distance to the center of the central marking) is determined based on the central marking information, and then the process proceeds to S233. At S233, the condition for the positions of the additional points is set so that the distance between the line segment connecting the additional points and the central marking is the distance determined at S232, and then the process proceeds to S24 of FIG. 13. Alternatively, at S233, the line segment connecting the additional points may be set so that the distance between the line segment connecting the additional points and the central marking is the distance determined at S232 or longer. The distance determined at S232 may correspond to a threshold.

At S24, the additional points $p_1$ and $p_2$ are set based on expressions (1) and (2) and the condition set at S23, and then the process proceeds to S25. At S25, a B-spline curve is calculated by using the start point $p_s$, the end point $p_f$, and the additional points $p_1$ and $p_2$ as control points, and then the process proceeds to S26. At S26, the curvature and curvature change rate of the calculated curve are calculated, and then the process proceeds to S27.

It is determined at S27 whether the maximum curvature of the curve and the number of sign changes in curvature are less than or equal to the respective predetermined thresholds based on the calculated curvature and curvature change rate. When at least one of the maximum curvature and the number of sign changes in curvature is determined to exceed the corresponding threshold, the process proceeds to S28, the values of α and β in expressions (1) and (2) are changed, and then the process returns to S24. When both the maximum curvature and the number of sign changes in curvature are determined to be less than or equal to the respective thresholds at S27, the process proceeds to S29. At S29, the calculated curve is output as the short route and then the process proceeds to a process of setting a right turn waiting position illustrated at S30 of FIG. 12.

Figure 15:
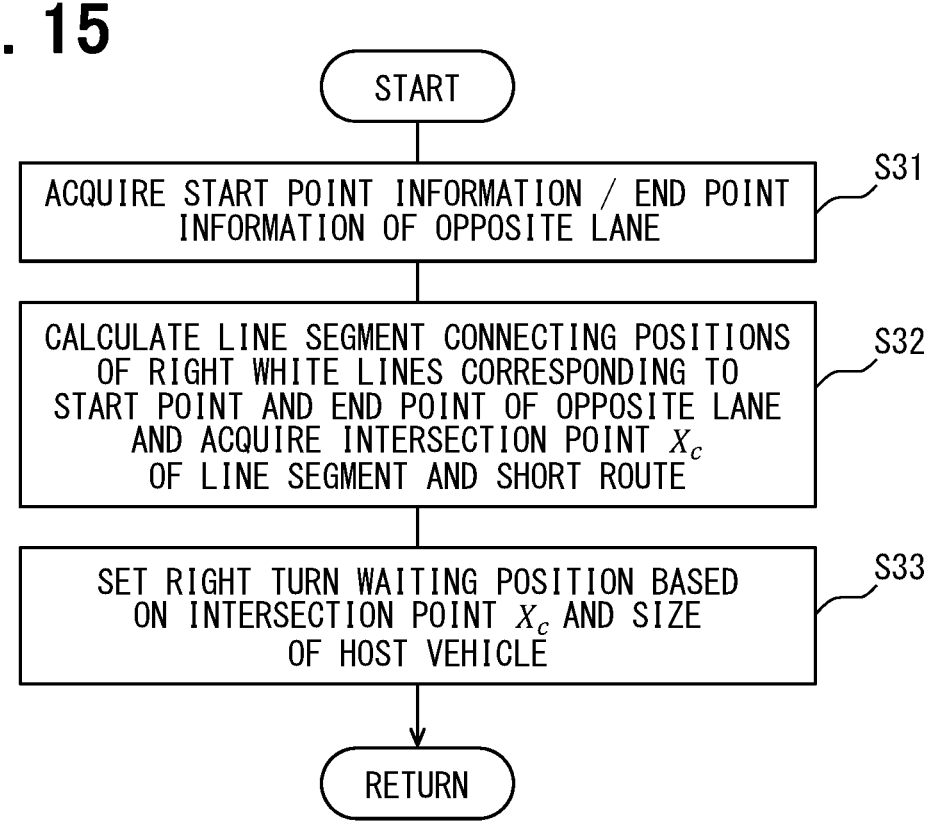
FIG. 15 is a flowchart illustrating details of S30 of FIG. 12.

The process of setting a right turn waiting position on the short route is specifically described with reference to FIG. 15. At S31, information about a start point and an end point of an opposite lane is first acquired and then the process proceeds to S32. At S32, the position of an intersection point Xc of a line segment connecting the positions of right white lines corresponding to the start point and the end point of the opposite lane and the short route is acquired and then the process proceeds to S33. At S33, the right turn waiting position is set on the short route based on the position of the intersection point Xc and the size of the subject vehicle, and then the process proceeds to S40 of FIG. 12.

It is determined at S40 whether there is an opposite lane to an approach lane based on information from the map DB 10. When it is determined that there is an opposite lane, the process proceeds to S50. At S50, whether the opposite lane includes a right-turn-only lane is determined. When it is determined that the opposite lane does not include a right-turn-only lane, the process proceeds to S60. At S60, a wide turn route is created and a right turn waiting position is set on the wide turn route.

Figure 16:
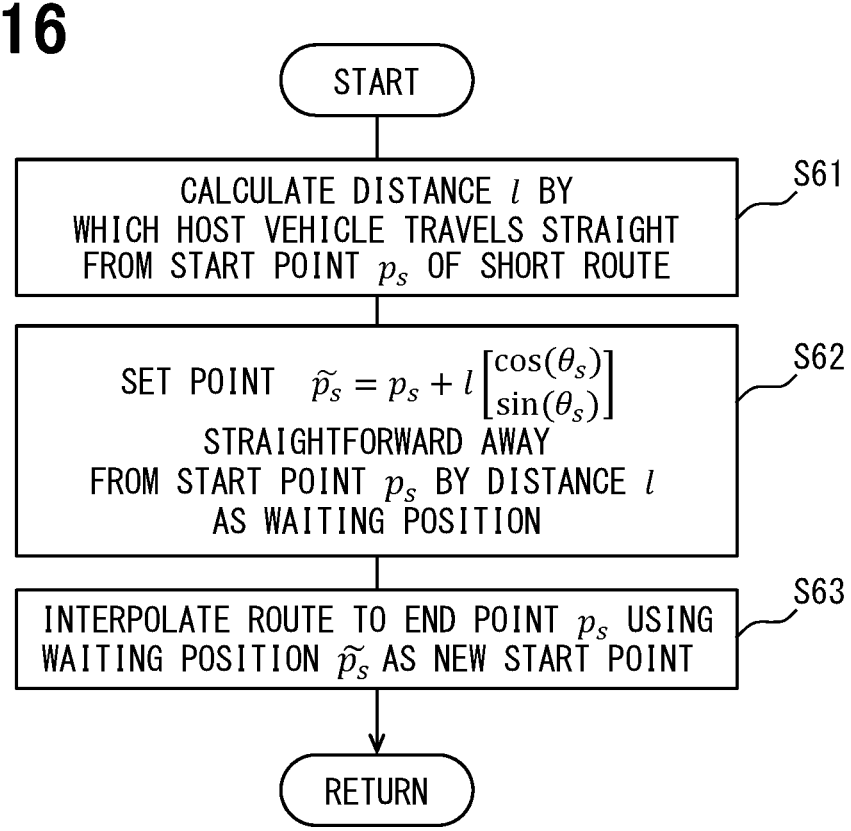
FIG. 16 is a flowchart illustrating details of S60 of FIG. 12.
Figure 17:
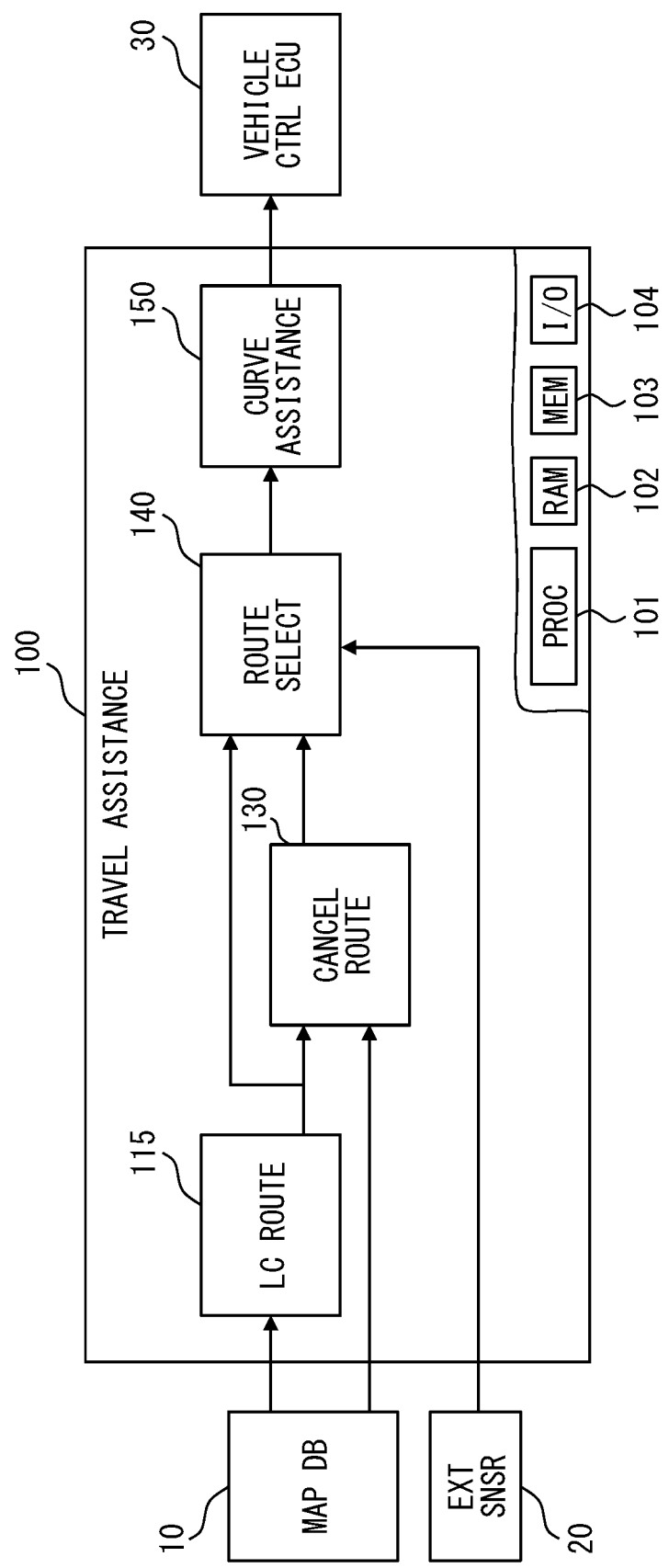
FIG. 17 is a block diagram of a travel assistance apparatus according to a second embodiment.
Figure 20A:
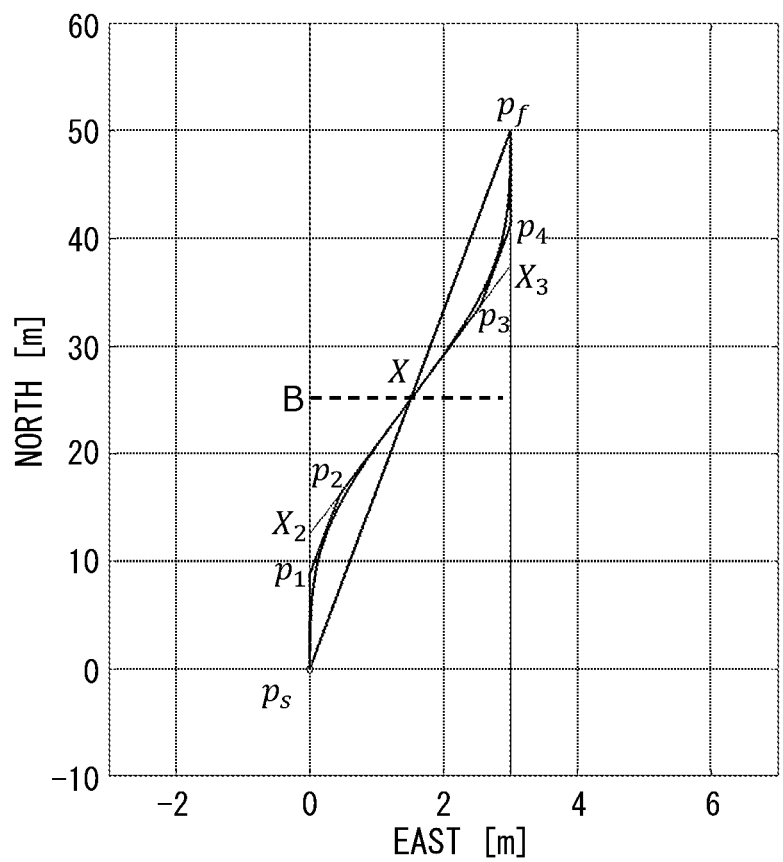
FIG. 20A is a schematic view of a quadrangle assumed in creating an LC route.
Figure 20B:
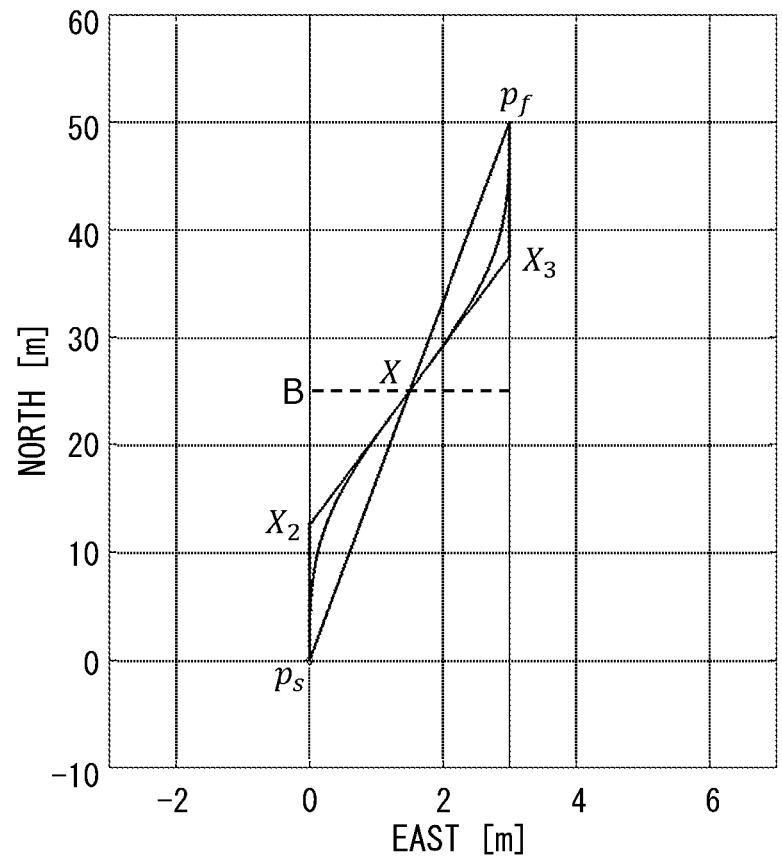
FIG. 20B is a schematic view of a triangle assumed in creating an LC route.
Figure 21A:
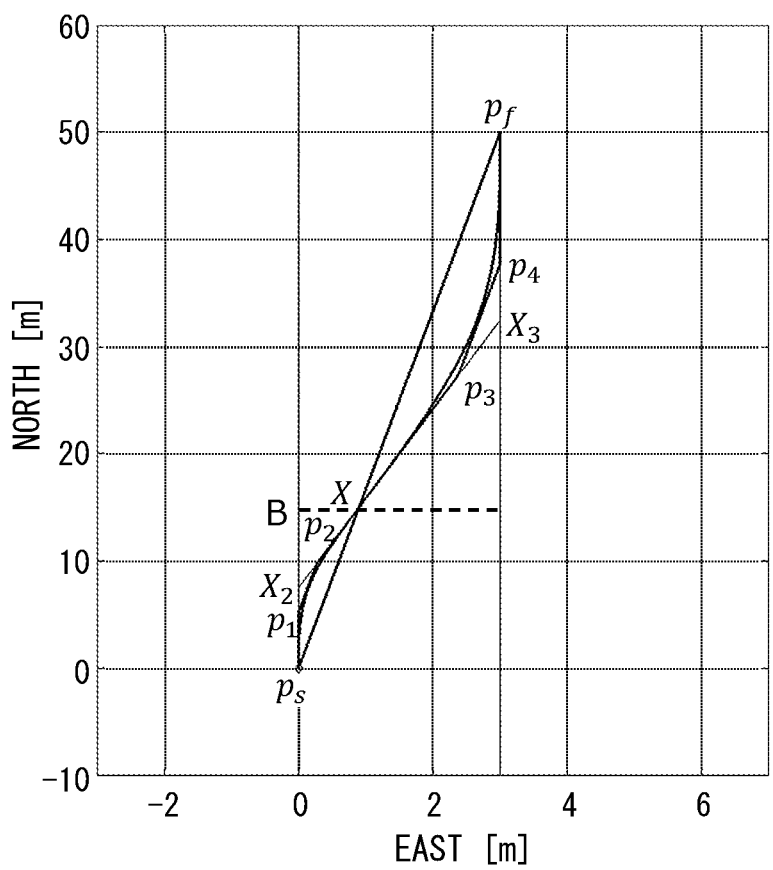
FIG. 21A is a schematic view of a quadrangle assumed in creating an LC route.
Figure 21B:
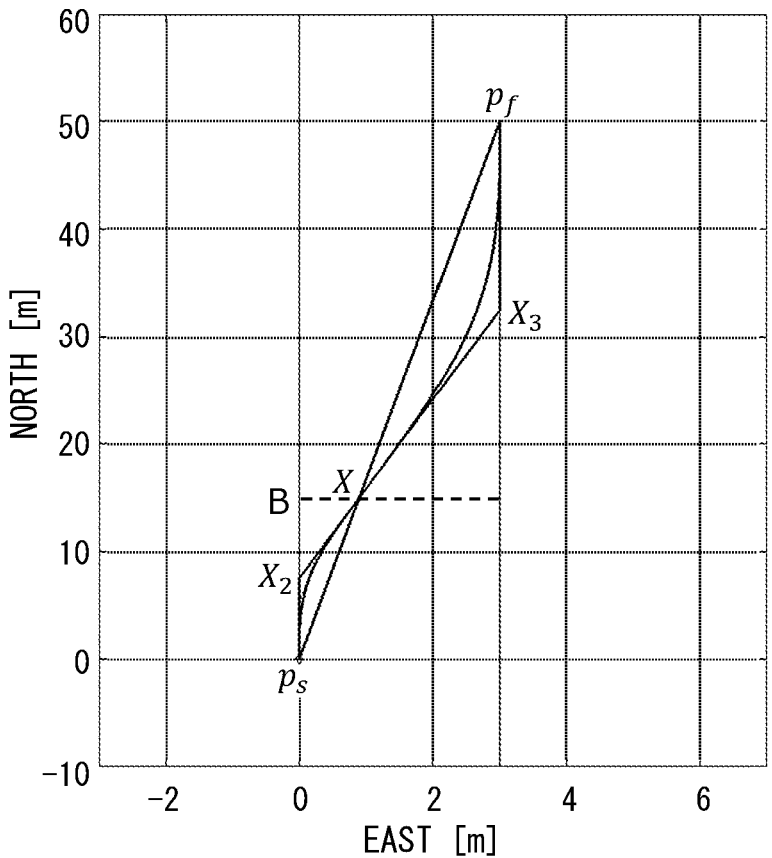
FIG. 21B is a schematic view of a triangle assumed in creating an LC route.
Figure 22A:
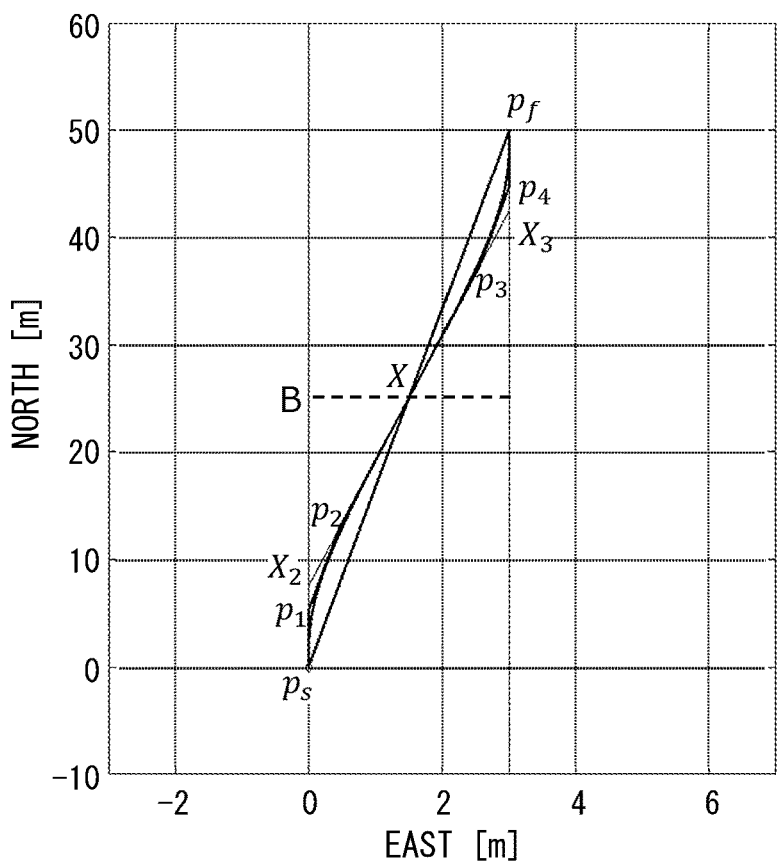
FIG. 22A is a schematic view of a quadrangle assumed in creating an LC route.
Figure 22B:
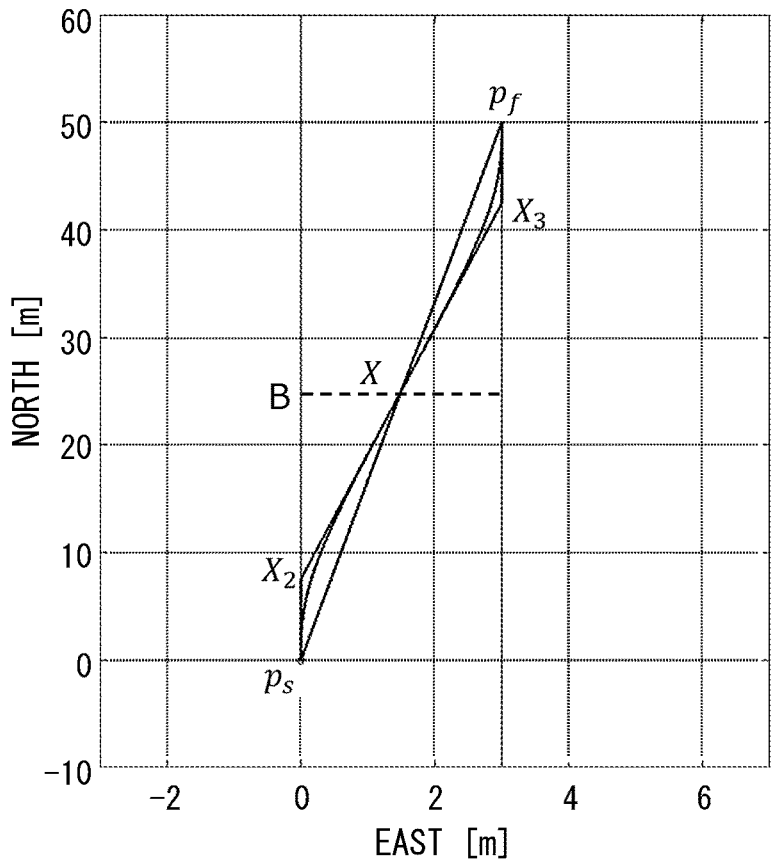
FIG. 22B is a schematic view of a triangle assumed in creating an LC route.

The process about the wide turn route is specifically described with reference to FIG. 16. At S61, the distance l by which the subject vehicle travels straight from the start point $p_s$ of the short route is first calculated and then the process proceeds to S62. At S62, the point straightforward away from the start point $p_s$ by the distance l is set as the right turn waiting position and then the process proceeds to S63. At S63, a B-spline curve connecting the set right turn waiting position and the end point $p_f$ is created in the same manner as in creating the short route (S21 to S29), and then the process proceeds to S70 of FIG. 12. Incidentally, a situation wherein the subject vehicle travels straightforward may mean a travel direction of the subject does not change substantially as compared with a travel direction at the start point $p_s$.

At S70, in order to select an actual travel route from the short route and the wide turn route, whether there is an oncoming vehicle is determined based on information from the external sensor 20. When it is determined that there is an oncoming vehicle, the process proceeds to S80, the wide turn route is selected as the travel route, and then the process proceeds to S100.

When it is determined at S40 that there is no opposite lane or when it is determined at S50 that there is a right-turn-only lane, the process proceeds to S90. In these cases, at S90, the short route is selected as the travel route without creating a wide turn route, and then the process proceeds to S100.

In addition, when it is determined at S70 that there is no oncoming vehicle, the process also proceeds to S90. Among the created short route and wide turn route, the short route is selected as the travel route, and then the process proceeds to S100.

At S100, the subject vehicle in an autonomous travel mode starts to enter the selected route, and then the process proceeds to S110. At S110, whether there is an oncoming vehicle is determined after the subject vehicle enters the route. The determination process at S110 is performed before the subject vehicle reaches the right turn waiting position on the route. When it is determined that there is no oncoming vehicle, the process proceeds to S120. At S120, the subject vehicle does not stop at the right turn waiting position and continues to travel along the route. When the subject vehicle reaches the end point and the travel along the route is completed, a series of processing ends.

When it is determined at S110 that there is an oncoming vehicle, the process proceeds to S130. At S130, the subject vehicle stops at the right turn waiting position set on the selected route to wait for the oncoming vehicle to pass, and then the process proceeds to S140.

It is determined at S140 whether the subject vehicle may start from the right turn waiting position. For example, it is determined at S140 that the subject vehicle may start when the oncoming vehicle is not detected based on the information from the external sensor 20. Alternatively, it may be determined at S140 that the subject vehicle may start when the driver performs an operation of permitting start by, for example, pressing a start permission switch. The determination process at S140 is repeatedly performed until it is determined that the subject vehicle may start. When it is determined that the subject vehicle may start, the process proceeds to S150. At S150, the subject vehicle starts and completes the travel along the route. A series of processing then ends.

Operations and effects of the configuration of the travel assistance apparatus 100 according to the first embodiment will be described.

The travel assistance apparatus 100 sets a start point and an end point of a route when a subject vehicle turns right at an intersection and also additional points on two sides of a triangle including the start point and the end point as two vertexes. The travel assistance apparatus 100 calculates a route line accommodated in a quadrangle including the start point, the end point, the two additional points as four vertexes to assist the subject vehicle in traveling a curve along the route line. The travel assistance apparatus 100 can prevent generation of a route line out of the quadrangle. Consequently, the travel assistance apparatus 100 can reduce deviation of the subject vehicle when the subject vehicle turns right at the intersection.

In most cases, there are no lanes on both sides of the subject vehicle at the intersection unlike straight roads. It is thus difficult to create a right turn route based on lanes. The travel assistance apparatus creates a route by the method described above. Since it is not necessary to acquire many pieces of information about points in an intersection area where the subject vehicle is to travel, the right turn route can be created with the relatively reduced amount of information.

The travel assistance apparatus 100 sets the intersection point of a half line extending from the start point in a direction of an approach lane and a half line extending from the end point in a direction of an exit lane as a third vertex of a triangle. It may be possible to prevent the route line from becoming a curved shape externally projecting within the intersection. Consequently, the travel assistance apparatus 100 can assist the subject vehicle in traveling along a curve within the intersection with reduced deviation.

The travel assistance apparatus 100 sets the right turn waiting position of the subject vehicle at a position nearer to the start point than a portion where the route line crosses the opposite lane. The travel assistance apparatus 100 can thus set the right turn waiting position where the subject vehicle does not hinder the traffic of oncoming vehicles.

Since the travel assistance apparatus 100 sets the additional points so that the distance between a line segment connecting the additional points and a no-entry area is larger than or equal to a threshold, the route line can be calculated so as to avoid the no-entry area. The travel assistance apparatus 100 can assist the subject vehicle in traveling along a curve with reduced deviation while avoiding entering the no-entry area.

The travel assistance apparatus 100 creates a wide turn route in which the position straightforward away from the start point of the short route is set as the right turn waiting position. With the travel assistance apparatus 100, the subject vehicle can wait on the wide turn route while facing the straight direction. Consequently, the travel assistance apparatus 100 can prevent the subject vehicle from entering the travel area of an oncoming vehicle during waiting to turn right.

When there is no oncoming vehicle, the travel assistance apparatus 100 selects the short route. When there is an oncoming vehicle, the travel assistance apparatus 100 selects the wide turn route. When there is no oncoming vehicle, the travel assistance apparatus 100 can select with priority a short-distance route in which the subject vehicle can quickly turn right. When there is an oncoming vehicle, the travel assistance apparatus 100 can select with priority a route that secures more safety.

While creating a right turn route at an intersection has been described above, a left turn route can be created in the same manner as the right turn route.

Second Embodiment

A modification of the travel assistance apparatus 100 according to the first embodiment will be described in a second embodiment. In FIG. 17 to FIG. 24, the same components with the same signs as in the drawings of the first embodiment achieve the same operations and effects. In the second embodiment, the travel assistance apparatus 100 creates a travel route at the time of lane change (hereinafter, "LC route"). The travel assistance apparatus 100 includes an LC route creation section 115 and a cancel route creation section 130 in addition to the functional blocks of the first embodiment.

In the second embodiment, the LC route creation section 115 first sets a starting point (also referred to as a departure point) and an arrival point in a case of lane change. The travel assistance apparatus 100 sets the current position of a subject vehicle as the starting point. In order to set the arrival point, the LC route creation section 115 determines a target space where the subject vehicle enters in a lane to which the subject vehicle changes from the original lane (hereinafter, "change target lane") based on information from the external sensor 20 and the map DB 10. The LC route creation section 115 determines the target space based on whether the distance between the preceding vehicle ahead of the space and the following vehicle behind the space is larger than or equal to a predetermined distance or whether the subject vehicle can reach the space within a predetermined time. The LC route creation section 115 sets a target speed of the subject vehicle for adjusting the position of the space in a front-back direction.

The LC route creation section 115 sets a lane-change completion time (for example, 7 seconds). The completion time is determined based on the distance to other surrounding cars, a travel route after lane change, and the traffic. The LC route creation section 115 determines the speed of the subject vehicle during lane change (lane change speed) based on the speed of the preceding vehicle and the following vehicle travelling the change target lane and the relative distance from the subject vehicle to the preceding vehicle and the following vehicle. The speed of the preceding vehicle and the following vehicle is assumed to be fixed. The LC route creation section 115 sets the position of the arrival point based on the lane change speed and the lane-change completion time. The LC route creation section 115 creates an LC route based on position information of the set starting point and position information of the set arrival point.

Creation of an LC route will be described with reference to FIG. 18 to FIG. 22B. In the example of FIG. 18 to FIG. 22B, the LC route creation section 115 sets a point that is east 3 m and north 50 m from a starting point as an arrival point.

The LC route creation section 115 sets a passing point X that satisfies the following expression (4) on a line segment connecting the starting point and the arrival point.

$$X = a p_s + (1-a) p_f \qquad \text{Expression (4)}$$

In expression (4), the range of a is $0<\alpha<1$. The LC route creation section 115 calculates a first route line in which the starting point is a first start point and the passing point X is a first end point and a second route line in which the passing point X is a second start point and the arrival point is a second end point.

Specifically, the LC route creation section 115 sets an auxiliary point $X_2$ on a line segment connecting the starting point $p_s$ and a projective point B of the passing point X. The projective point B is an intersection point of a line extending from the starting point in a traveling direction of the original lane (north-south direction) and a perpendicular line drawn from the passing point toward the line. The LC route creation section 115 thus assumes a triangle including the start point (starting point) $p_s$, the end point (passing point) X, and the auxiliary point $X_2$ as three vertexes.

The LC route creation section 115 sets an additional point $p_1$ satisfying the following expression (5) on a line segment connecting the start point $p_s$ and the auxiliary point $X_2$, and an additional point $p_2$ satisfying the following expression (6) on a line segment connecting the auxiliary point $X_2$ and the passing point X. The LC route creation section 115 assumes a quadrangle including the additional points $p_1$ and $p_2$, the start point $p_s$, and the passing point X as four vertexes.

$$p_1 = \alpha p_s + (1-\alpha) X_2 \qquad \text{Expression (5)}$$

$$p_2 = \beta p_f + (1-\beta) X_2 \qquad \text{Expression (6)}$$

The range of $\alpha$ in expression (5) is $0<\alpha<1$. The range of $\beta$ in expression (6) is $0<\beta<1$. The LC route creation section 115 calculates a route line within the quadrangle. The LC route creation section 115 performs interpolation using a B-spline curve as in the case of creating a right turn route at an intersection to calculate a route line passing the start point $p_s$ and the passing point X.

In addition, the LC route creation section 115 also calculates a second auxiliary curve between the passing point X and the arrival point. Specifically, the LC route creation section 115 sets an intersection point $X_3$ of a line passing the auxiliary point $X_2$ and the passing point X and a half line extending from the end point $p_f$ in a backward direction of a change target lane. The LC route creation section 115 sets additional points that respectively satisfy the following expressions (7) and (8) based on the position information of the intersection point $X_3$.

$$p_3 = \alpha_2 X + (1-\alpha_2) X_3 \qquad \text{Expression (7)}$$

$$p_4 = \beta_2 X_3 + (1-\beta_2) p_f \qquad \text{Expression (8)}$$

The range of $\alpha_2$ in expression (7) is $0<\alpha_2<1$. The range of $\beta_2$ in expression (8) is $0<\beta_2<1$. The LC route creation section 115 calculates a route line within the quadrangle including the passing point, the arrival point, and the additional points as the vertexes. As described above, the LC route creation section 115 calculates the route line between the starting point $p_s$ and the passing point X and between the passing point X and the arrival point $p_f$, thus creating an LC route from the starting point $p_s$ through the passing point X to the arrival point $p_f$.

The LC route creation section 115 can change the shape of the LC route by changing the positions of the passing point X and the auxiliary point $X_2$. Assuming that the length from the starting point $p_s$ to the arrival point $p_f$ is 1, the ratio of the length from the starting point $p_s$ to the passing point X and the length from the passing point X to the arrival point $p_f$ is represented as "passing point ratio". Assuming that the length from the starting point $p_s$ to the projective point B of the passing point X is 1, the ratio of the length from the starting point $p_s$ to the auxiliary point $X_2$ and the length from the auxiliary point $X_2$ to the projective point B is represented as "auxiliary point ratio". That is to say, the LC route creation section 115 can create an LC route in various shapes by changing these passing point ratio and auxiliary point ratio. The LC route creation section 115 can thus determine whether a subject vehicle firstly turns a steering wheel sharply or travels straight a relatively long distance.

For example, the LC route creation section 115 sets the length from the starting point $p_s$ to the passing point X to be shorter than the length from the passing point X to the arrival point $p_f$ to create an LC route in which the subject vehicle firstly turns the steering wheel sharply to the side of a change target lane to enter the change target lane, and then gradually returns the steering wheel (see FIG. 19A to FIG. 19C, and FIG. 21A and FIG. 21B). This LC route is similar to a travel route at the time of lane change in a manual drive mode.

In addition, the LC route creation section 115 sets the length from the starting point $p_s$ to the auxiliary point $X_2$ to be shorter than the length from the auxiliary point $X_2$ to the projective point B to create an LC route in which the subject vehicle travels obliquely a relatively long distance when changing lane from the original lane to the change target lane (see FIG. 19A to FIG. 19C, and FIG. 22A and FIG. 22B).

The cancel route creation section 130 creates a route in which a subject vehicle cancels lane change and returns from an LC route to a travel route on the original lane (LC cancel route). The cancel route creation section 130 acquires a nearest neighbor point closest to the subject vehicle on the created LC route. The cancel route creation section 130 sets the nearest neighbor point as the start point of the LC cancel route. The cancel route creation section 130 acquires a point on the original lane ahead of the nearest neighbor point by a predetermined distance (for example, vehicle speed V [m/sec]×5 [sec]). The travel assistance apparatus sets this point as the end point of the LC cancel route. The cancel route creation section 130 creates the LC cancel route so as to connect the acquired start point and end point as in the case of an LC route. The cancel route creation section 130 successively creates the LC cancel route during lane change. The LC cancel route is an example of a cancel route line.

During lane change, the route selection section 140 successively determines to select the LC route or the LC cancel route. The curve assistance section 150 outputs information of the route selected by the route selection section 140 to the vehicle control ECU 30.

The route creation process performed by the travel assistance apparatus 100 for the purpose of achieving curve assistance at the time of lane change, which has been described above, will be described in detail with reference to flowcharts of FIG. 23 and FIG. 24.

The travel assistance apparatus 100 determines at S310 whether there is a lane change request. When it is determined that there is a lane change request, the process proceeds to S320. At S320, a starting point and an arrival point are set and then the process proceeds to S330.

At S330, it is determined whether a half line extending from the starting point in the traveling direction of the original lane crosses a half line extending from the arrival point in the backward direction of a change target lane. When it is determined at S330 that the half lines cross each other, the process proceeds to S355. An LC route constituted by a single route line is created as in the case of creating a short route in the first embodiment, and then the process proceeds to S360.

When it is determined at S330 that the half lines do not cross each other, the process proceeds to S340 and an LC route constituted by two route lines is created.

The process of creating an LC route with two route lines will be described in detail with reference to FIG. 24. At S341, the passing point X based on expression (4) is first set on the line segment connecting the starting point and the arrival point and then the process proceeds to S342. At S342, the auxiliary point $X_2$ is set on the half line extending from the starting point in the traveling direction of the original lane, and then the process proceeds to S343. At S343, the additional points $p_1$ and $p_2$ are set respectively based on expressions (5) and (6), and then the process proceeds to S344. At S344, a B-spline curve is calculated by using the four points [$p_s$, $p_1$, $p_2$, X] as control points, and then the process proceeds to S345.

At S345, the auxiliary point $X_3$ is set and then the process proceeds to S346. At S346, the additional points $p_3$ and $p_4$ are set respectively based on expressions (7) and (8), and then the process proceeds to S347.

At S347, B-spline curves are calculated by using the four points [X, $p_3$, $p_4$, $p_j$] as control points, and then the process proceeds to S348. At S348, it is determined whether these two B-spline curves satisfy the condition for the travel route. When it is determined that the B-spline curves do not satisfy the condition, the process proceeds to S349, the values of a, $\alpha$, $\beta$, $\alpha_2$, and $\beta_2$ are changed, and then the process proceeds to S341.

Figure 23:
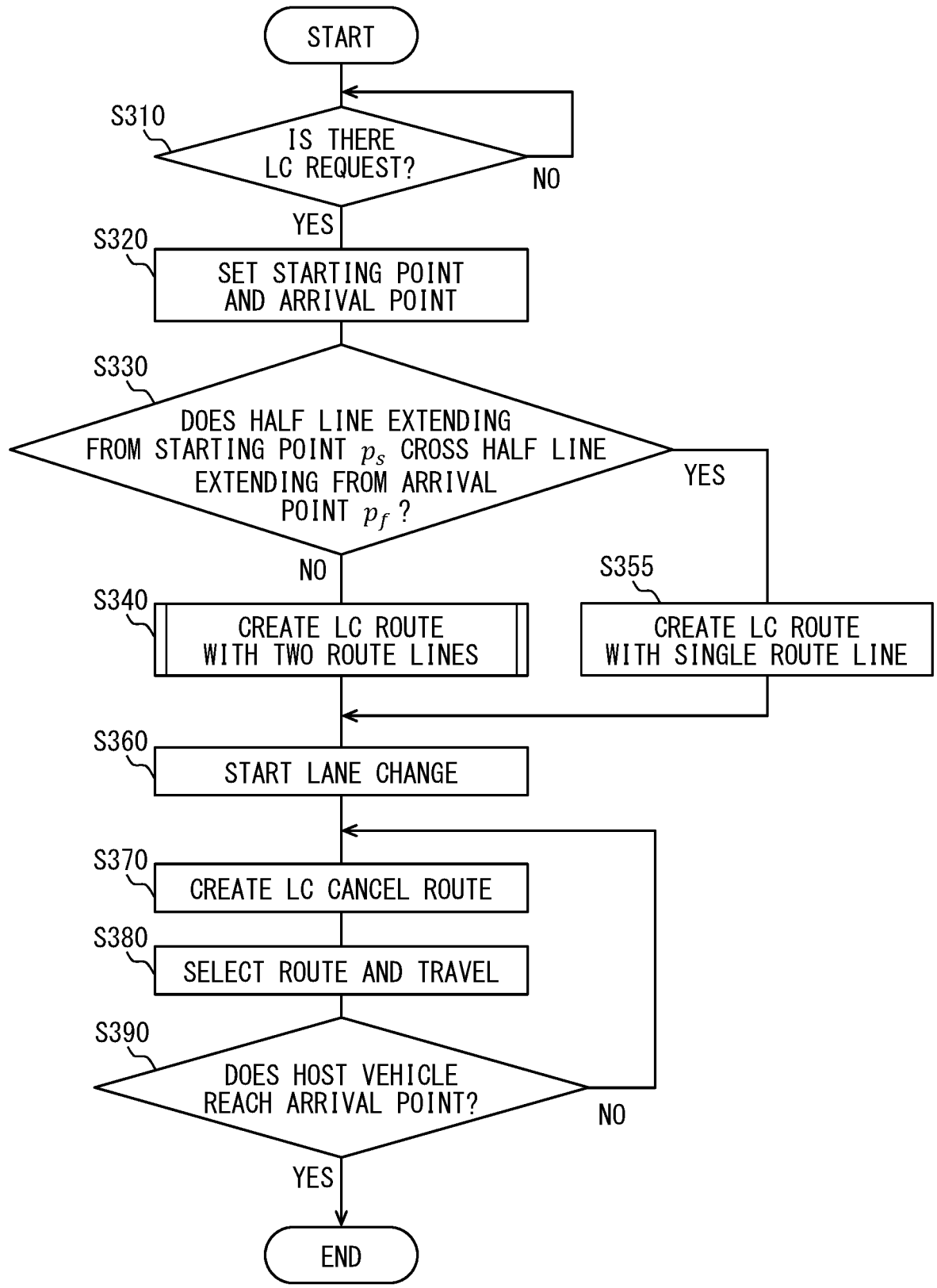
FIG. 23 is a flowchart of an example of processing performed by the travel assistance apparatus.
Figure 24:
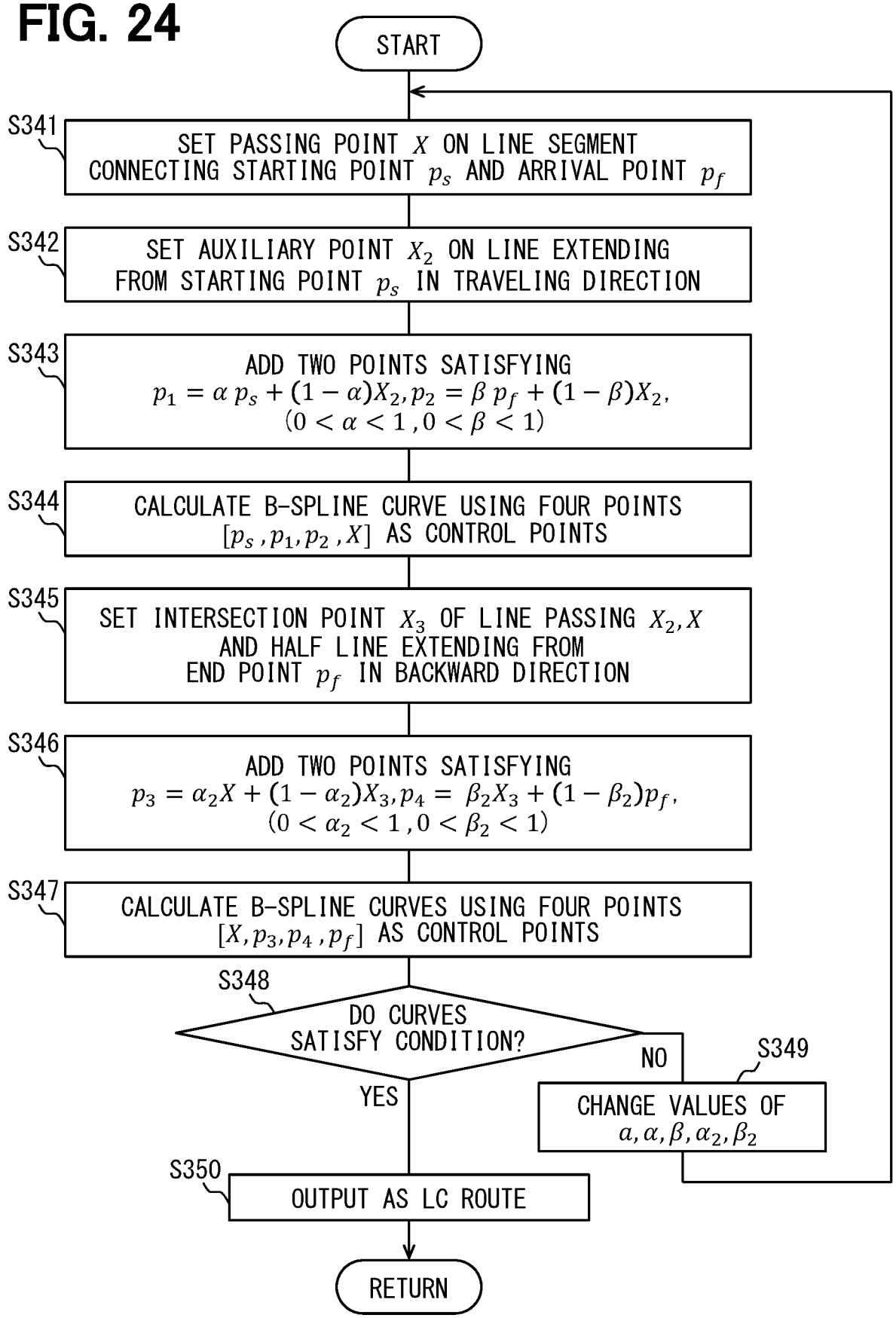
FIG. 24 is a flowchart illustrating details of S340 of FIG. 23.

When it is determined at S348 that the B-spline curves satisfy the condition, the process proceeds to S350, a route line formed by these two curves is output as the LC route, and then the process proceeds to S360 of FIG. 23.

At S360, the subject vehicle starts to travel along the created LC route and then the process proceeds to S370. At S370, an LC cancel route is created, and then the process proceeds to S380. At S380, the LC route or the LC cancel route is selected as the route along which the subject vehicle travels, and then the process proceeds to S390. At S390, it is determined whether the subject vehicle reaches the arrival point (end point) of the selected route. When the subject vehicle does not reach the end point, the process proceeds to S370. When it is determined that the subject vehicle reaches the arrival point, a series of processing ends.

The travel assistance apparatus 100 according to the second embodiment sets an auxiliary point on a line segment connecting a starting point and an arrival point of lane change and calculates an interpolation curve in which the starting point is a start point and the auxiliary point is an end point and an interpolation curve in which the auxiliary point is the start point and the arrival point is the end point, thus creating an LC route. Consequently, the travel assistance apparatus 100 can create a travel route in which a subject vehicle travels along a curve from the original lane to the side of a change target lane and then travels straight toward the arrival point. The travel assistance apparatus 100 can thus achieve curve assistance more suitable for lane change.

When a half line extending from the starting point in a direction of the original lane crosses a half line extending from an ending point in a direction of the change target lane, the travel assistance apparatus 100 calculates a route line in which the starting point is the start point and the ending point is the end point. The travel assistance apparatus 100 can thus create a travel route suitable for lane change on a curve.

The travel assistance apparatus 100 calculates an LC cancel route for the subject vehicle to return to the original lane. Consequently, when the subject vehicle cancels lane change and returns to the original lane, the travel assistance apparatus 100 can achieve travel assistance while reducing deviation of the subject vehicle.

Other Embodiments

The disclosure in the specification is not limited to the illustrated embodiments. The disclosure includes the illustrated embodiments and modifications made by those skilled in the art based on the illustrated embodiments. For example, the disclosure is not limited to combinations of components and/or elements described in the embodiments. The disclosure can be implemented by various combinations. The disclosure may include additional portions to be added to the embodiments. The disclosure includes a mode in which some components and/or elements of the embodiments are omitted. The disclosure includes replacements of components and/or elements between one embodiment and another embodiment, or combinations thereof. The disclosed technical scope is not limited to the description of the embodiments. Note that some of the disclosed technical ranges are described in the description of the claims and intended to include meaning equivalent to the scope of the claims and all changes within the scope.

While the above embodiments have described a case of turning right or left at an intersection and a case of lane change, the travel assistance apparatus and the travel assistance method may be used in various cases requiring a turn of a subject vehicle. For example, the travel assistance apparatus and the travel assistance method may be used for travel assistance in merging. In the travel assistance in merging, the travel assistance apparatus 100 may create a merging route as in the case of creating an LC route in the second embodiment, for example. That is, the travel assistance apparatus 100 may create a travel route by regarding the case of merging as the case of lane change from a merging lane into a main lane. When a travel route cannot be created before a subject vehicle reaches the end point of the merging lane because the distance between other vehicles traveling on the main lane is reduced, the travel assistance apparatus 100 stops the subject vehicle at a point on the merging lane away from other vehicles on the merging lane by a predetermined distance and near the end point. In this case, the travel assistance apparatus 100 creates a travel route again after the subject vehicle stops.

In the embodiments described above, the travel assistance method is achieved by the program executed by the processing unit of the in-vehicle ECU. Alternatively, at least a part of the processing may be performed by a center that manages a subject vehicle through wireless communication, for example. In addition, the travel assistance method may be achieved by multiple in-vehicle ECUs performing the distributed processing.

While the travel assistance apparatus and the travel assistance method are used in curve assistance during automated driving, the travel assistance apparatus and the travel assistance method may be used in curve assistance during manual driving. For example, curve assistance may be performed by creating a recommended route along which a subject vehicle is recommended to travel with the method described above and suggesting the recommended route to a driver through HUD. Alternatively, an evaluation route for evaluating a travel route driven by the driver may be created by the method described above. When the actual travel route is out of the evaluation route, the travel assistance apparatus and the travel assistance method may offer the driver some advice, thus performing curve assistance.

The processor in the embodiments may be a processing unit including one or more CPUs (Central Processing Units). Such a processor may be a processing unit that includes, in addition to a CPU, a graphics processing unit (GPU), a data flow processor (DFP), or the like. Furthermore, the processor may be a processing unit including an FPGA (Field-Programmable Gate Array) and an IP (intellectual property) core specialized for specific processing such as learning and inference of AI (artificial intelligence). Each arithmetic circuit of such a processor may be individually mounted on a printed circuit board, or may be mounted on an application specific integrated circuit (ASIC) or an FPGA.

Various non-transitory tangible memory medium (i.e., non-transitory tangible storage medium) such as a flash memory, a hard disk, may be used as a memory device storing a control program. The mode of a storage medium may be changed as appropriate. For example, the storage medium may have a mode of a memory card or the like, and may be inserted into a slot provided in an in-vehicle ECU and electrically connected to a control circuit.

Controllers and methods described in the present disclosure may be implemented by a special purpose computer created by configuring a memory and a processor programmed to execute one or more particular functions embodied in computer programs. Alternatively, apparatus and a method described in the present disclosure may be implemented by a special purpose computer. Further alternatively, the apparatus and the method described in the present disclosure may be implemented by one or more special purpose computers created by configuring a combination of at least one processor to execute a computer program and at least one hardware logic circuit. The computer programs may be stored, as instructions being executed by a computer, in a tangible non-transitory computer-readable medium.

The description in the above embodiments is adapted to the region where left-hand traffic is designated by law. In the region where right-hand traffic is designated by law, left and right are reversed.

It is noted that a flowchart or the processing of the flowchart in the present application includes multiple steps (also referred to as sections), each of which is represented, for instance, as S10. Further, each step can be divided into several sub-steps while several steps can be combined into a single step.

While various embodiments, configurations, and aspects of travel assistance method and travel assistance apparatus according to the present disclosure have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of the present disclosure.

What is claimed is:

1. A travel assistance method that is performed by a computer including at least one processor, the travel assistance method assisting travel of a subject vehicle and comprising:
    setting a start point and an end point of a route where the subject vehicle travels along a curve;
    assuming a triangle in which a remaining vertex is determined such that the triangle is formed by the start point, the remaining vertex and the end point;
    setting a control point on each of two sides of the triangle to determine a quadrangle including the two control points, the start point, and the end point as four vertexes;
    calculating a route line accommodated in the quadrangle; and
    assisting the subject vehicle in traveling along the curve following the route line,
    wherein:
    assisting the subject vehicle in traveling along the curve following the route line includes turning right or left at an intersection;
    the travel assistance method further comprises acquiring position information of a no-entry area within the intersection; and
    the quadrangle is determined by setting the control points so as to cause a distance between a line segment connecting the control points and the no-entry area to be larger than or equal to a a threshold.

2. The travel assistance method according to claim 1, wherein:
    assisting the subject vehicle in traveling along the curve following the route line includes turning right or left at an intersection; and
    at the assuming of the triangle, the remaining vertex of the triangle is located at an intersection point of a half line extending from the start point in a direction of entering the intersection and a half line extending from the end point in an opposite direction to a direction of exiting the intersection.

3. The travel assistance method according to claim 1, wherein:
    assisting the subject vehicle in traveling along the curve following the route line includes turning right or left at an intersection; and
    the travel assistance method further comprises setting a waiting position of the subject vehicle on the route line at a position nearer to the start point than a position where the route line crosses an opposite lane.

4. The travel assistance method according to claim 1, wherein:
assisting the subject vehicle in traveling along the curve following the route line includes turning right or left at an intersection; and
the travel assistance method further comprises
determining the route line as a first route line,
determining the start point as a first start point,
determining a second start point on the first route line straightforward away from the first start point by a predetermined distance,
calculating a second route line passing the second start point, and
setting a waiting position between the first start point and the second start point, the waiting position being for a case of travelling the second route line.

5. The travel assistance method according to claim 4, further comprising,
determining whether an oncoming vehicle exists, wherein,
at the assisting of the subject vehicle in traveling along the curve,
in response to a determination that no oncoming vehicle exists, the travel of the subject vehicle along the curve following the first route line is assisted, and
in response to a determination that the oncoming vehicle exists, the travel of the subject vehicle along the curve following the second route line is assisted.

6. The travel assistance method according to claim 4, further comprising:
determining whether an opposite lane exists; and
suspending calculation of the second route line in response to a determination that no opposite lane exists.

7. The travel assistance method according to claim 1, wherein:
assisting the subject vehicle in travelling along the curve following the route lines includes changing lanes;
the travel assistance method further comprises
setting a departure point and an arrival point for lane change, and
setting a passing point where the subject vehicle passes on a line connecting the departure point and the arrival point;
at the setting of the start point and the end point, the departure point is set as a first start point, the passing point is set as a first end point and also as a second start point, and the arrival point is set as a second end point;
at the assuming of the triangle, a first triangle including the first start point, the first end point, and a point on a half line extending forward from the first start point in a traveling direction as three vertexes is assumed, and a second triangle including the second start point, the second end point, and a point on a half line extending backward from the second end point in the traveling direction as three vertexes is also assumed; and
at the calculating of the route line, a first route line between the first start point and the first end point is calculated, and a second route line between the second start point and the second end point is also calculated.

8. The travel assistance method according to claim 7, further comprising:
determining whether a half line extending forward from the departure point in a traveling direction crosses a half line extending backward from the arrival point in the traveling direction; and
calculating the route line in which the departure point is the start point and the arrival point is the end point in response to a determination that the half lines cross each other.

9. The travel assistance method according to claim 8, wherein,
the calculating of the route line is performed to calculate the first route line and the second route line in response to a determination that the half lines do not cross each other at the determining whether the half lines cross each other.

10. The travel assistance method according to claim 7, further comprising,
calculating a cancel route line in which the subject vehicle changing lanes returns from the route line to a travel route before the lane change.

11. A travel assistance apparatus comprising:
a point setting section that sets a start point and an end point of a route when a subject vehicle travels along a curve and assumes a triangle in which a remaining vertex is determined such that the triangle is formed by the start point, the remaining vertex and the end point;
a route line calculation section that sets a control point on each of two sides of the triangle to determine a quadrangle including the two control points, the start point, and the end point as four vertexes, and the route line calculation section calculates a route line accommodated in the quadrangle; and
a curve assistance section that assists the subject vehicle in traveling along the curve following the route line,
wherein:
assisting the subject vehicle in traveling along the curve following the route line includes turning right or left at an intersection;
the point setting section is configured to acquire position information of a no-entry area within the intersection; and
the quadrangle is determined by setting the control points so as to cause a distance between a line segment connecting the control points and the no-entry area to be larger than or equal to a threshold.

12. A travel assistance apparatus comprising:
at least one processor connected to a memory, wherein:
the at least one processor sets a start point and an end point of a route when a subject vehicle travels along a curve and assumes a triangle in which a remaining vertex is determined such that the triangle is formed by the start point, the remaining vertex and the end point;
the at least one processor sets a control point on each of two sides of the triangle to determine a quadrangle including the two control points, the start point, and the end point as four vertexes, and the at least one processor calculates a route line accommodated in the quadrangle; and
the at least one processor assists the subject vehicle in traveling along the curve following the route line, causing the subject vehicle to follow the route line, wherein:
assisting the subject vehicle in traveling along the curve following the route line includes turning right or left at an intersection;
the at least one processor further configured to acquire position information of a no-entry area within the intersection; and the quadrangle is determined by setting the control points so as to cause a distance between a line segment connecting the control points and the no-entry area to be larger than or equal to a threshold.

* * * * *